US012795037B2

(12) United States Patent
Demetrescu

(10) Patent No.: US 12,795,037 B2
(45) Date of Patent: Nov. 10, 2026

(54) MOTION PICTURE FILM IMAGE STABILIZATION METHOD AND SYSTEM

(71) Applicant: Lasergraphics, Inc., Irvine, CA (US)

(72) Inventor: Stefan G. Demetrescu, Irvine, CA (US)

( * ) Notice: Subject to any disclaimer, the term of this patent is extended or adjusted under 35 U.S.C. 154(b) by 383 days.

(21) Appl. No.: 18/425,139

(22) Filed: Jan. 29, 2024

(65) Prior Publication Data

US 2025/0247492 A1 Jul. 31, 2025

(51) Int. Cl.
*H04N 3/40* (2006.01)
*H04N 5/262* (2006.01)

(52) U.S. Cl.
CPC ............. *H04N 3/40* (2013.01); *H04N 5/2628* (2013.01)

(58) Field of Classification Search
CPC ....................... H04N 3/00–405; H04N 5/2628
USPC ............... 396/1–661; 352/1–244; 353/1–122
See application file for complete search history.

(56) References Cited

U.S. PATENT DOCUMENTS 6,278,483 B1 8/2001 Sartor
6,450,644 B1 * 9/2002 Goodhill .................. G03B 1/42 352/162
6,556,273 B1 * 4/2003 Wheeler .............. G03B 27/521 352/92
11,381,713 B2 7/2022 Klevatt
11,924,575 B1 * 3/2024 Lindner ................. H04N 5/253
2003/0011748 A1 * 1/2003 Varian .................... H04N 5/253 348/E5.049

FOREIGN PATENT DOCUMENTS

| | | |
|---|---|---|
| DE | 3614611 A1 | 11/1987 |
| EP | 2769538 B1 | 7/2018 |
| EP | 3393116 A1 | 10/2018 |
| WO | 0011862 A1 | 3/2000 |

OTHER PUBLICATIONS

European Office Action & Extended European Search Report dated Aug. 16, 2024, Application No. 24154445.1.

* cited by examiner

*Primary Examiner* — Christopher A Lamb, II

(57) ABSTRACT

The present invention provides a motion picture film image stabilization method that uses (a) a coincident exposure process to capture a predetermined number of marked frames of a film wherein each marked frame includes a marked image and fiducial mark(s); (b) developing the film; (c) digitizing the film to convert each of the marked frames into a digital marked scan having a digital image of the marked image and the digital fiducial mark(s); and repositioning each digital image of each digital marked scan using dimensional position of the digital fiducial marks. This method can be achieved via the present invention's system comprising a motion picture film camera, a fiducial system, a scanner, and a processor.

20 Claims, 19 Drawing Sheets

MOTION PICTURE FILM IMAGE STABILIZATION METHOD AND SYSTEM

FIELD OF INVENTION

The present invention relates to a motion picture film image stabilization method and system which improve the stability of images captured on motion picture photographic film and subsequently converted into digital images using a motion picture film scanning/digitizing system.

BACKGROUND OF INVENTION

Referring to FIGS. 1-6, the process of digitizing a photographic motion picture film 10 begins with capturing images 12 on the film 10 via a motion picture camera 14. Film 10 typically includes perforations 16 along the edges 18 of the film 10 to facilitate the film's 10 motion through the camera 14 and other post-production equipment. As the film 10 is mechanically advanced from one image $\mathbf{12}_{(n)}$ to the next image $\mathbf{12}_{(n+1)}$, the camera's 14 mechanism attempts to place the film 10 so that each image 12 is exposed in the same position 22 relative to the perforations 16 and/or the edges 18.

Referring to FIGS. 1-4, the camera 14 conventionally includes a camera lens 24 secured within the camera 14 via a lens mount 25, which creates an internal captured image 12 of the external environment (not shown). The camera 14 further includes rotating sprockets 26 to continuously engage the perforations 16 to advance the film 10 and to maintain loops on the two sides (hereinafter referred to as the upper loop 28 and the lower loop 30 of a film gate 32. Please note that it is possible but uncommon that the film 10 includes no perforations 16 and the film 10 is moved using rollers (e.g., rubber capstan rollers or the like). The film gate 32 keeps the film 10 flat within the film gate aperture 34 (i.e., the opening in a film gate aperture plate 38 through which light 44 from the camera lens 24 can reach the film 10 to project the image 12 of the external environment onto the film emulsion 20 by providing a film gate backing plate 36 and the film gate aperture plate 38 to sandwich the film 10 as shown in FIG. 4. Film emulsion 20 is a very thin light-sensitive layer on the surface of the film 10. Referring to FIG. 3, a claw mechanism 40 intermittently pulls the film 10 from the top loop 28 to the lower loop 30 while a shutter 42 prevents the light 44 from the camera lens 24 from reaching the film 10 while the film 10 is in motion. Once the motion of the claw mechanism 40 is finished, the film 10 is held motionless in the film gate 32 and the shutter 42 continues to rotate to allow the light 44 to reach the film 10, thus exposing the next image $\mathbf{12}_{(n+1)}$. The film gate 32 is mounted in a fixed position relative to the camera lens 24 and therefore the film 10 itself is held motionless with respect to the camera lens 24 during the exposure process. The portion of the film 10 that is exposed by the light 44 from the camera lens 24 (hereinafter referred to as the "exposed film portion" 46) is limited by the film gate aperture 34 as shown in FIG. 4, which results in the exposed film portion 46 shown in FIG. 5. The exposed portion 46 is where the captured images 12 are located. The film gate aperture 34 thus prevents light from reaching the film emulsion 20 at all times and consequently leaves certain portions of the film unexposed at all times (e.g., between the perforations 16, between the captured images 12 (i.e., the exposed portions 46), near the edges 18, etc. and hereinafter referred to as the "unexposed film portion" 48) as shown in FIG. 5.

As described above, conventional cameras 14 use mechanical means (e.g., the sprockets 26, the claw mechanism 40, etc.) to position the perforations 16 and the edges 18 in approximately the same position 22 for the exposure of each image. The image stability relative to the associated perforations 16 and edges 18 from one image $\mathbf{12}_{(n)}$ to the next image $\mathbf{12}_{(n+1)}$ is therefore limited by the camera's ability to place the film 10 in the same position 22 from one image $\mathbf{12}_{(n)}$ to the next image $\mathbf{12}_{(n+1)}$.

After the images 12 have been captured by the camera 14, the film 10 is then developed and subsequently scanned using a motion picture film scanner 50 to convert the sequential images 12 into sequential digital scans 58 of digital images 52 with digital representations of the perforations 16 and the film edges 18 (respectively shown as "17" and "19" in FIG. 6). It should be noted that the scanner 50 typically images a film portion that is greater than the digital image $\mathbf{52}_{(n)}$. Thus, in addition to imaging digital image $\mathbf{52}_{(n)}$ it also images a portion of the previous digital image $\mathbf{52}_{(n+1)}$ and next digital image $\mathbf{52}_{(n+1)}$, and some or all of the nearby perforations 17 and film edges 19 as shown in FIG. 6. Scanner 50 may not image all of the perforations 17 and/or the film edges 19. It is acceptable that the scanner 50 only images a portion of the perforations 17 near the digital image $\mathbf{50}_{(n)}$.

Conventional scanners 50 generally use the perforations 16 and/or the edges 18 to determine the location of each of the image 12 to be digitized. This is typically accomplished in one of two ways: (i) the physical positioning of the film 10, and/or (ii) digital image post-processing. With the physical positioning approach and referring to FIG. 7, the scanner 50 physically engages the perforations 16 and/or the edges 18 to position the film 10 in a known scanning location 54 while the image 12 is back-illuminated by scanner light source 68 and captured/scanned by the scanner's digital camera 56. With the digital image post-processing approach, the film 10 is only approximately positioned in the scanning location 54 while the image 12 is being digitized resulting in the digital scan 58. The digital scan 58 usually includes not only the digital image 52 but is over-scanned to include all or part of nearby perforations 17 and/or the edges 19 as shown in FIG. 6. Then, the scanner's 50 digital image processing is employed to detect the positions of the perforations 16 and/or the edges 18 by using the digital representations of the perforations 17 and edges 19. This position information is then used to infer the position of the digital image 52 on the digital scan 58 and then this area is stabilized relative to the physical features of the film 10 (e.g., the perforations 16 and/or the edges 18) by translating and/or rotating digital scan 58. This brings the digital representation of the perforations 17 and edges 19 to a fixed location for each subsequent digital scan, and thus digital image 52 is also brought to a fixed location, consequently stabilizing its position relative to the perforations and film edges from frame to frame.

Unfortunately, the entire conventional scanning/digitizing process described above relies on the physical accuracy of three separate physical processes: (i) the perforation and edge cutting system of the film manufacturing process, (ii) the camera 14 film positioning system, and (iii) the scanner 50 film positioning system. These physical systems have limits on their accuracy and repeatability from image $\mathbf{12}_{(n)}$ to image $\mathbf{12}_{(n+1)}$. These limits result in acceptable image stability when the image resolution is relatively low. For example, when scanning 35 mm 4 perforation film images at 2K resolution (i.e., 2,000 pixels in width), each pixel is approximately 0.5 thousandths of an inch on the film's surface. To keep the image position accurate to less than one 2K pixel, it is necessary for all three of the aforementioned physical processes to result in a cumulative overall error of less than 0.5 thousandths of an inch. This typically means that each of the processes must be much more accurate than that. While this can be achieved with much effort and expense for 2K images, it becomes impractical when the scanning resolution of the film increases to 4K, 8K, 12K, or more. At 12K, for example, the cumulative physical error would have to be kept to less than 0.1 thousandths of an inch.

Furthermore, the physical handling of the film 10 during the process of manufacturing, exposing, developing, and scanning the film 10 can subtly distort and damage the perforations 16 and/or the edges 18 because the film 10 is made of relatively soft materials (e.g., plastic), while the mechanisms that handle the film 10 (guides, claw mechanism 40, sprockets 26, etc.) are made of relatively hard materials (e.g., chrome metal). Since image stabilization depends on the shape and location of these physical features, positioning accuracy is degraded further.

Typically, the film emulsion 20 which is placed on top of the film's 10 base is 0.4 thousandths of an inch thick. See FIG. 1. This film emulsion 20 is composed of extremely fragile gelatin and flakes off at the perforations 16 and the edges 18 where the film emulsion 20 has been physically punched and cut. These emulsion flakes can interpose themselves between the perforations 16 and/or the edges 18 and the mechanism designed to engage the perforations 16 and/or the edges 18 accurately. This can result in a positioning error in the range of 0.4 thousandths of an inch which represents many pixels of positioning error at high scanning resolutions.

In light of the above, an image stabilization system that depends on the physical accuracy of the perforations 16 and/or the edges 18 is severely limited by: (i) the perforation and the edge cutting system of the film manufacturing process, (ii) the camera's film positioning system, (iii), the film positioning system of the scanner 50, (iv) damage to the perforations 16 and/or the edges 18, (v) flaking of the film emulsion 20.

An alternative to using the perforations 16 and/or the edges 18 for image stabilization involves using digital image stabilization techniques well known in the art which are applied after the image 12 is converted into a digital image 52 by the scanner 50. These techniques require that the stabilization be performed on the digital image 52 itself. Typically, an operator manually selects a selected element 62 of the digital image 52 which is subjectively determined to be stationary (e.g., a background building) as shown in FIG. 6 and the automatic digital image stabilization repositions each digital image 52 to keep the selected element 62 fixed from one digital scan $\mathbf{58}_{(n)}$ to the next digital scan $\mathbf{58}_{(n+1)}$. This approach has significant disadvantages because: (i) it requires an operator to subjectively select the selected element 62 which is presupposed to be stationary, (ii) every time the camera 14 moves during the capturing film image (12) process or a new scene begins resulting in a loss of the selected element 62, the operator must intervene again, thus requiring significant labor, (iii) some frame sequences contain no stable elements at all thereby preventing the selection of the selected element 62 (e.g., when the camera pans or zooms).

Other well-known digital stabilization techniques use the shadow 61 of the film gate aperture 34 to stabilize the digital image 52 as shown in FIG. 6. The premise is that the film gate aperture 34 is stable with respect to the film camera lens 24 and consequently stable with respect to the image 12), so when the shadow 61 of the film gate aperture 34 is digitally stabilized, then the digital image 52 itself will be stabilized. The major shortcoming of this approach is that some common film scenes do not have any exposure near the film gate aperture 34, therefore no shadow 61 is available. This is common in night scenes because large portions of the image 12 are completely unexposed, hence providing no shadow 61 for stabilization purposes. In addition, the film gate aperture plate 38 of some motion picture cameras 14 is loosely mounted with springs, thus the position of the shadow 61 of the film gate aperture 34 is not stable with respect to the camera lens 24, and thus not stable with respect to the image 12.

Based upon of the foregoing, a key problem existing in current motion picture film image systems is the difficulty in providing accurate and repeatable image positioning from frame to frame of a filmed image sequence (hereinafter referred to as "motion picture film image stabilization") that is essential for high resolution film scanning.

BRIEF DESCRIPTION OF THE DRAWING

The present invention will be more clearly understood when considering the accompanying drawing of which.

DESCRIPTION OF THE PREFERRED EMBODIMENT

Figure 9:
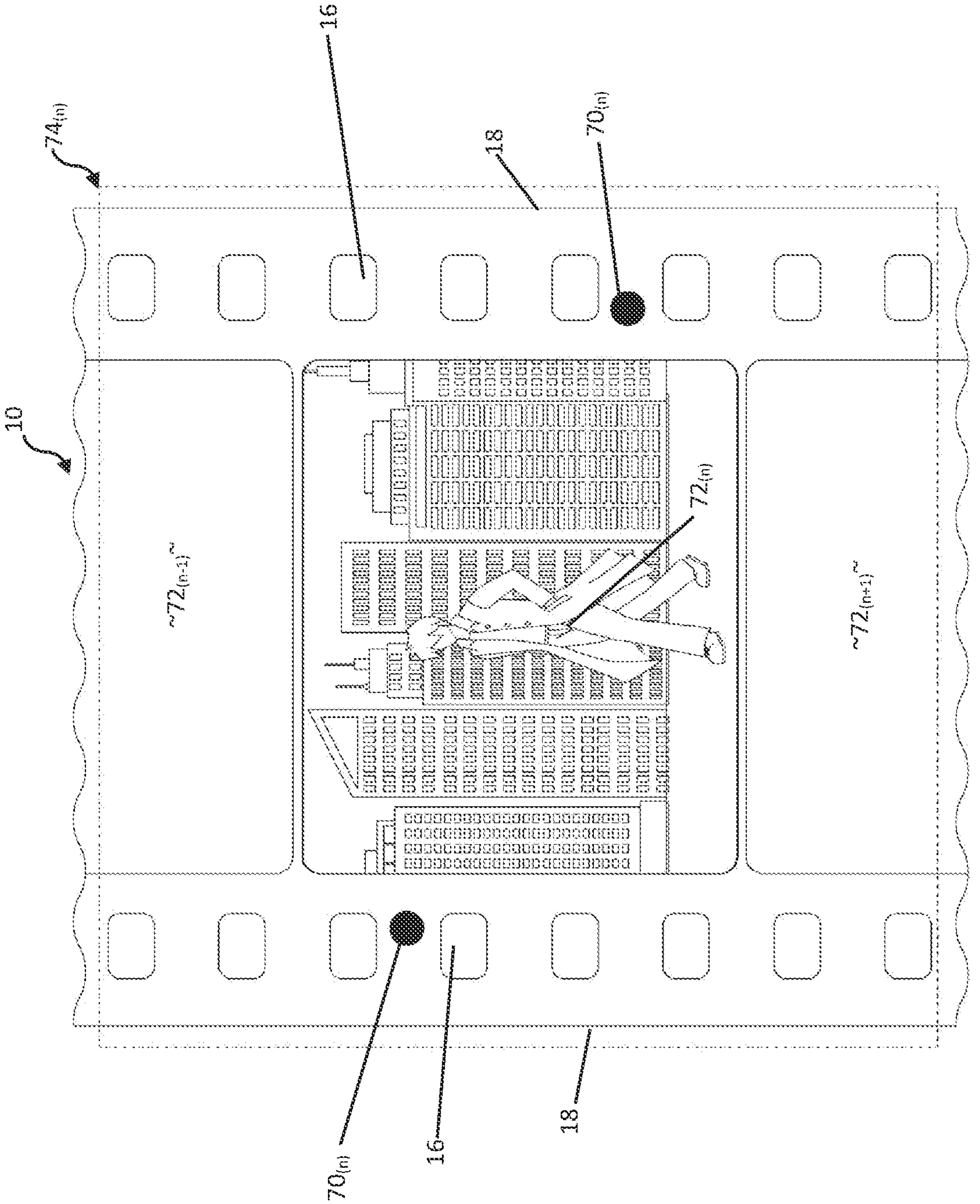
FIG. 9 schematically depicts a front view of the portion of the motion picture film illustrated in FIG. 2 having a marked frame, wherein the fiducial markers are located adjacent to the marked image.
Figure 10:
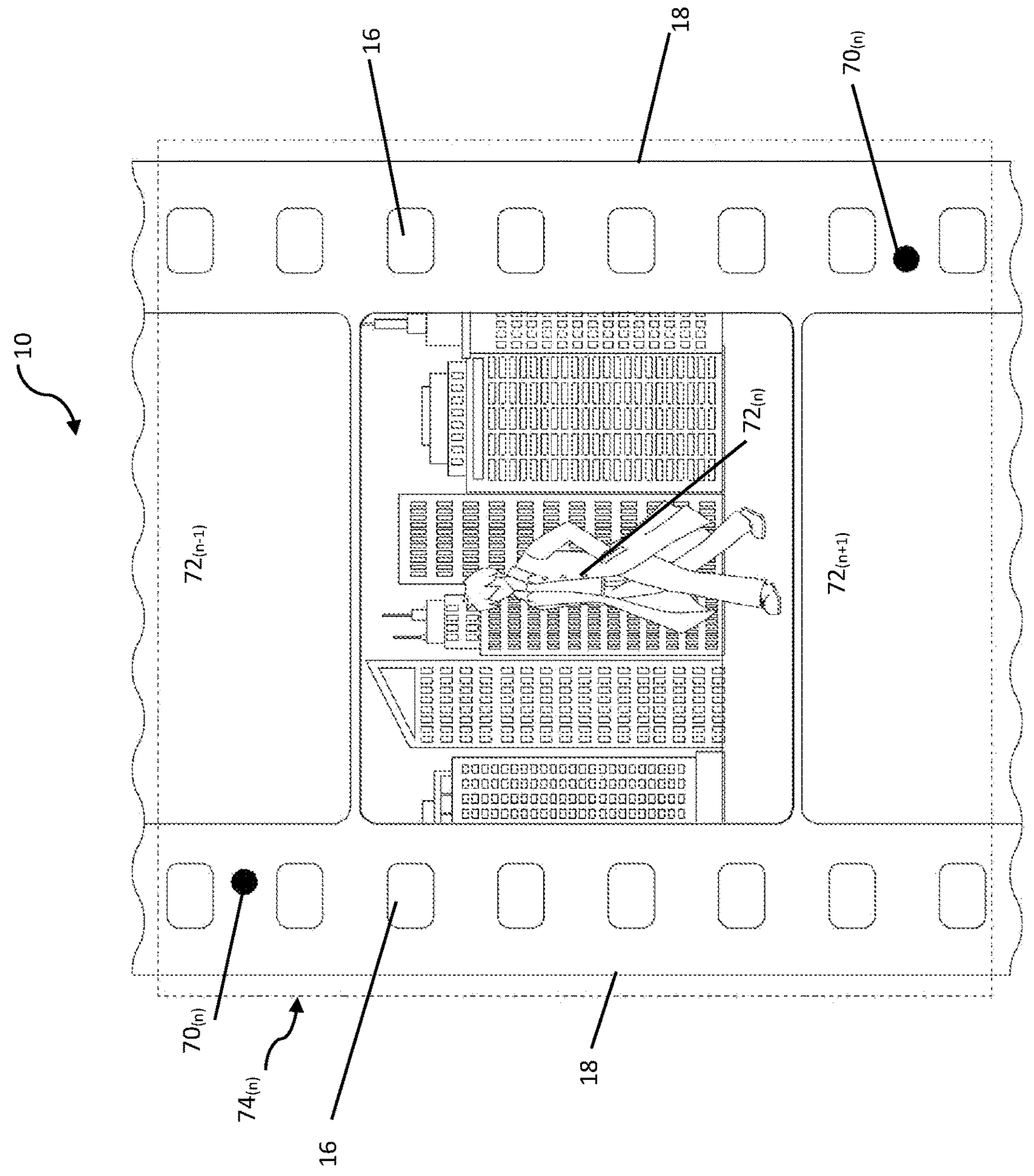
FIG. 10 schematically depicts a front view of the portion of the motion picture film illustrated in FIG. 2 having a marked frame, wherein the fiducial markers are located away from the marked image.

The present invention provides a motion picture film image stabilization method 100 that does not rely on the positional accuracy of the perforations 16 and/or edges 18, or the captured image's 12 content (e.g., no need for the content to have a selected element 62). Instead, and referring to FIGS. 8-19, the method 100 provides a motion picture film image stabilization system 200 by exposing/capturing at least one fiducial mark 70 onto the unexposed film portion 48 of the film 10 while the film 10 is being held motionless in the film gate 32 (hereinafter defined as a "film hold period"). During such film hold period, the film 10 is being held motionless in the film gate 32 to not only allow the capturing of the fiducial mark 70 but also to allow the camera 14 to expose the exposed film portion 46 of the film 10 to the light 44 coming from the external environment through the lens 24 resulting in a captured image of the external environment (hereinafter referred to as a "marked image 72") as shown in FIGS. 9-10. As shown in FIGS. 9-10, the combined area of the film 10 containing the exposed portion 46 and the unexposed portion 48 that is being held motionless in the film gate 32 during a specific film hold period is hereinafter defined as a "marked frame 74", which contains the marked image 72 and its associated the at least one fiducial mark 70.

During the film hold period for the marked frame 74, the film 10 is being held motionless in the film gate 32 so it is also motionless with respect to the camera lens 24. The marked image 72 is basically the same as the image 12 captured during the conventional motion picture filming process. The novel process of capturing both the fiducial mark 70 and its associated marked image 72 during the film hold period is hereinafter referred to as "coincident exposure process" 110.

The shape and sharpness of the at least one fiducial mark 70 are not critical. For example, the fiducial mark's 70 shape could be a circle, rectangle, cross, etc. While it is preferable for the fiducial mark 70 to have relatively sharp edges, it is not critical because modern image analysis techniques as known in the art can accurately determine the center of an isolated captured fiducial mark 70 with an accuracy that far exceeds the sharpness of the edges of the fiducial mark 70 itself (e.g., by using image processing techniques such as centroid determination which are well known in the art).

While the method 100 can be done with only one fiducial mark 70 being associated with the marked image 72, the image repositioning process 116 of the marked image 72 discussed below is more effective using two or more fiducial marks 70. Accordingly, the discussion hereinafter and the corresponding FIGS. 9-13 show two fiducial marks 70 even though the present invention also includes the use of just one fiducial mark 70 per digital scan 76 for the method 100 and the system 200.

It should be noted that the fiducial marks 70 don't necessarily need to be exposed/captured at exactly the same time as its associated marked image 72 for that the marked frame 74 as long as the fiducial marks 70 are exposed/captured while the film 10 is held motionless in the film gate 32 (i.e., during the film hold period) for the marked frame 74. Accordingly, during the film hold period, the fiducial marks 70 can be exposed/captured before, during, or a little after its associated marked image 72 is exposed/captured.

Referring to FIGS. 9-10, the fiducial marks 70 can be placed in any location on the unexposed film portion 48 (e.g., between the film perforations 16, between the marked images $\mathbf{72}_{(n,\ n+1\ and/or\ n,\ n-1)}$, outside of the film perforations 16 near the film edge 18, etc.). For example, and as shown in FIG. 9, the fiducial marks $\mathbf{70}_{(n)}$ can be located adjacent and/or in the immediate physical vicinity of the marked image $\mathbf{72}_{(n)}$ as shown in FIG. 9. However, it is not necessary to capture the fiducial marks $\mathbf{70}_{(n)}$ in the immediate physical vicinity of the marked image $\mathbf{72}_{(n)}$. For example, if the film gate 32 is long enough to hold the film 10 motionless well above and/or below the marked image $\mathbf{72}_{(n)}$, the fiducial marks $\mathbf{70}_{(n)}$ can be captured in the vicinity of one of the nearby (e.g., immediately before or after) marked images $\mathbf{72}_{(n-1,\ n+1)}$. For example, and referring to FIG. 10, the fiducial marks $\mathbf{70}_{(n)}$ are shown to be captured in the vicinity of the marked images $\mathbf{72}_{(n+1\ and\ n-1)}$ that are immediately before and after the marked image $\mathbf{72}_{(n)}$ associated with the fiducial marks $\mathbf{70}_{(n)}$ However, it should be noted that the fiducial marks $\mathbf{70}_{(n)}$ associated with the marked image $\mathbf{72}_{(n)}$ must be within the marked frame $\mathbf{74}_{(n)}$ having the marked image $\mathbf{72}_{(n)}$ as shown in FIGS. 9-10.

As noted above, the capturing of the fiducial marks 70 for the marked frame 74 must occur while the film 10 is in the same fixed position that it will be in for the capturing of the marked image 72 of such marked frame 74 (i.e., during the film hold period), resulting in the fiducial marks 70 being associated with the marked image 72. Basically, this fixed position requires no advancement of the film 10 to the next film frame position. The key here is that the film 10 does not move between the time that the marked image 72 is exposed/captured and the time that the fiducial marks 70 are exposed/captured for the marked frame 74.

After this coincident exposure process 110, the method 100 further includes developing of the film 10 containing the marked frames 74 using conventional method(s) well known in the arts.

Figure 11:
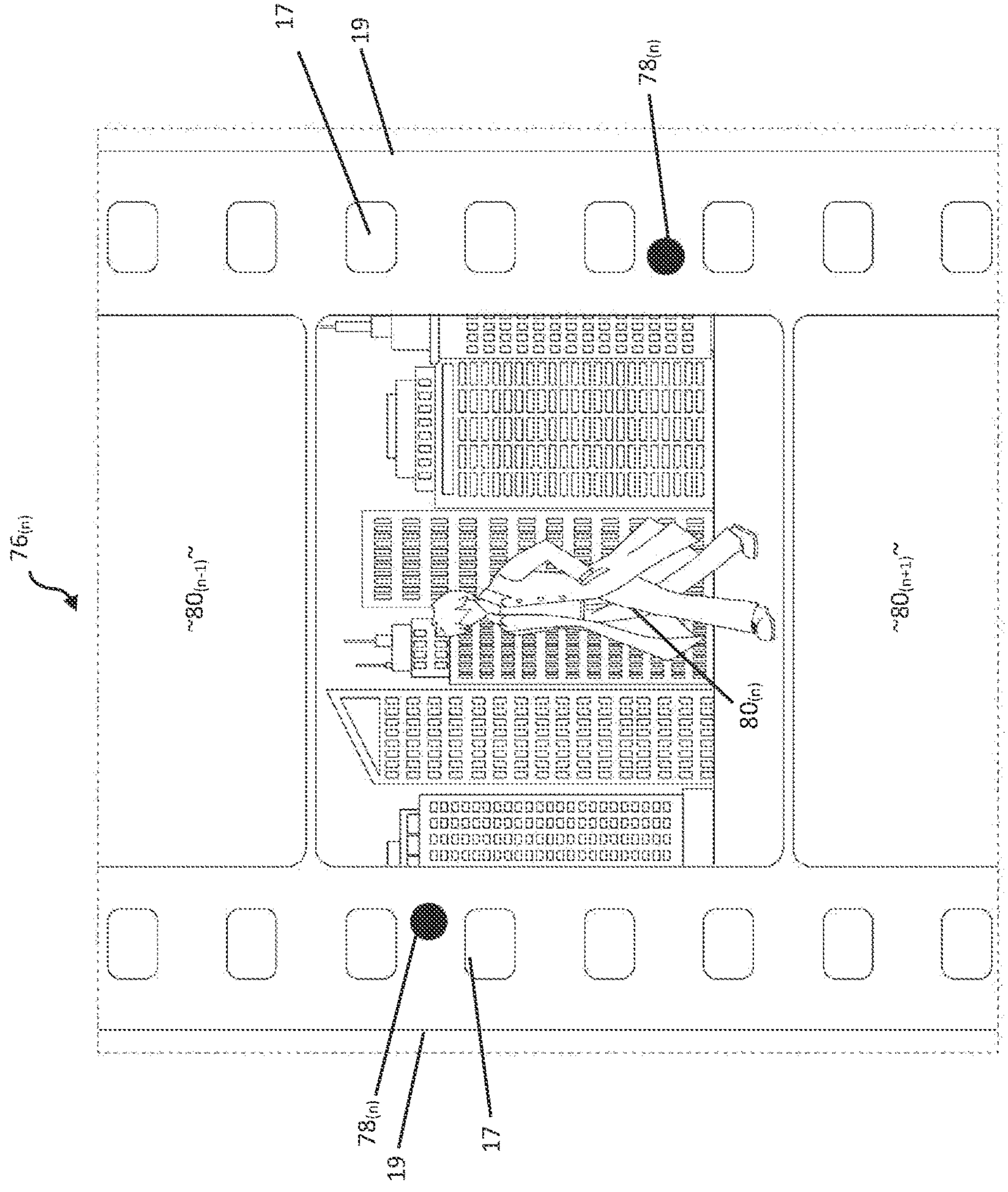
FIG. 11 schematically depicts a digital scan of the marked frame shown in FIG. 9.
Figure 12:
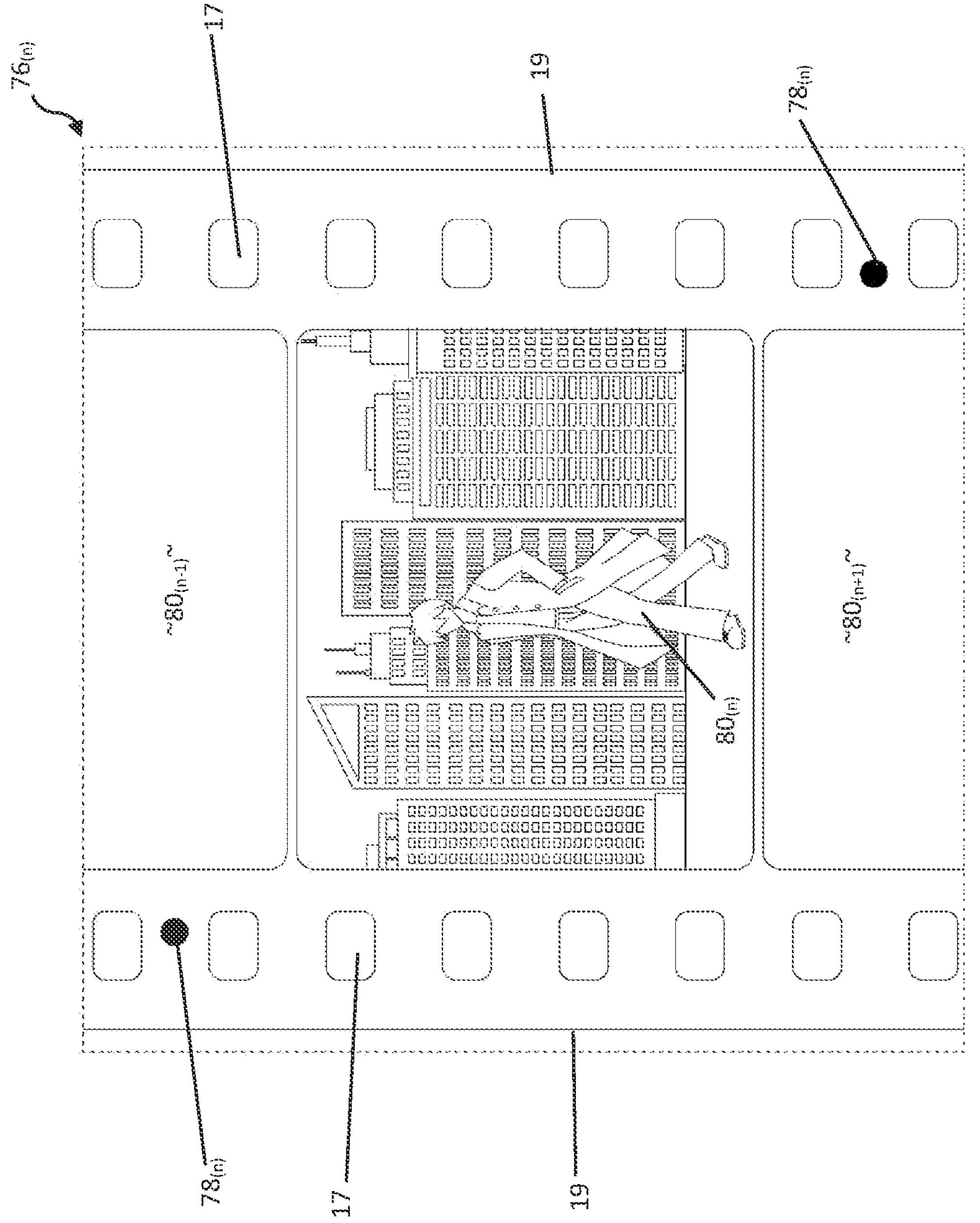
FIG. 12 schematically depicts a digital marked scan of the marked frame shown in FIG. 10.

Referring to FIGS. 11-12, once the film 10 having the marked frames 74 has been developed by the film developing process 112, the method 100 further includes digitizing the film 10 using a scanner (e.g., the scanner 50) resulting in digital marked scans 76 of the marked frames 74. This digitizing process 114 converts each of the marked frames 74 into a digital marked scan 76 having a digital image of the fiducial marks 70 (hereinafter referred to as "digital fiducial marks 78"), and the marked image 72 associated with such fiducial marks 70 (hereinafter referred to as "digital image 80"). As discussed above, the digital fiducial marks 78, can be located either in the immediate physical vicinity of the digital image 80 as shown in FIG. 11, or optionally, the digital fiducial marks 78 can be located physically distant from the digital image 80 as shown in FIG. 12.

This digitizing process 114 of the method 100 is achieved using the scanner 50 or any other art-disclosed motion picture film scanning system (see e.g., FIG. 7) capable of scanning a film surface area that is larger than the area of the film gate aperture 34 resulting in the digital marked scan 76. This process is referred to in the art as over-scanning of the film area as the over-scanned digital marked scan 76 includes not only the digital image 80$_{(n)}$, but also some of the digital perforations 17 and film edges 19 and possibly portions of the digital images 80$_{(n+1,\, n-1)}$ nearby as shown in FIGS. 11-12. Accordingly, the over-scan image area is large enough to allow the scanner 50 to capture and digitize each marked frame 74 having both the marked image 72 and the associated fiducial marks 70 resulting in having the digital fiducial marks 78 and the digital image 80 in the same digital marked scan 76. This is possible even when the fiducial marks 70 are located physically distant from the digital image 80$_{(n)}$ as shown in FIG. 12.

The method 100 may optionally include having the scanner 50 to also use traditional physical and/or digital image stabilization techniques to approximately stabilize the digital marked scan 76 with respect to the perforations 17 and/or the edges 19.

The method 100 includes using a digital image repositioning process 116 provided by an art-disclosed processor 81 to process each of the digital marked scans 76 by using conventional methods and techniques to reposition and stabilize the digital marked scan 76 (thus also the digital image 80 contained within the digital marked scan 76) based the dimensional position of the digital fiducial marks 78. The method 100 finds the digital fiducial marks 78 and translates and optionally rotates each digital marked scan 76 so that the digital fiducial marks 78 are moved to their fixed reference positions. Because the fiducial marks 70 are placed in a fixed position relative to the marked images 72 during the coincident exposure process 110 discussed above, the digital images 80 of the marked images 72 will also be stabilized from one digital marked scan 76$_{(n)}$ to the next digital marked scan 76$_{(n+1)}$.

Figure 13:
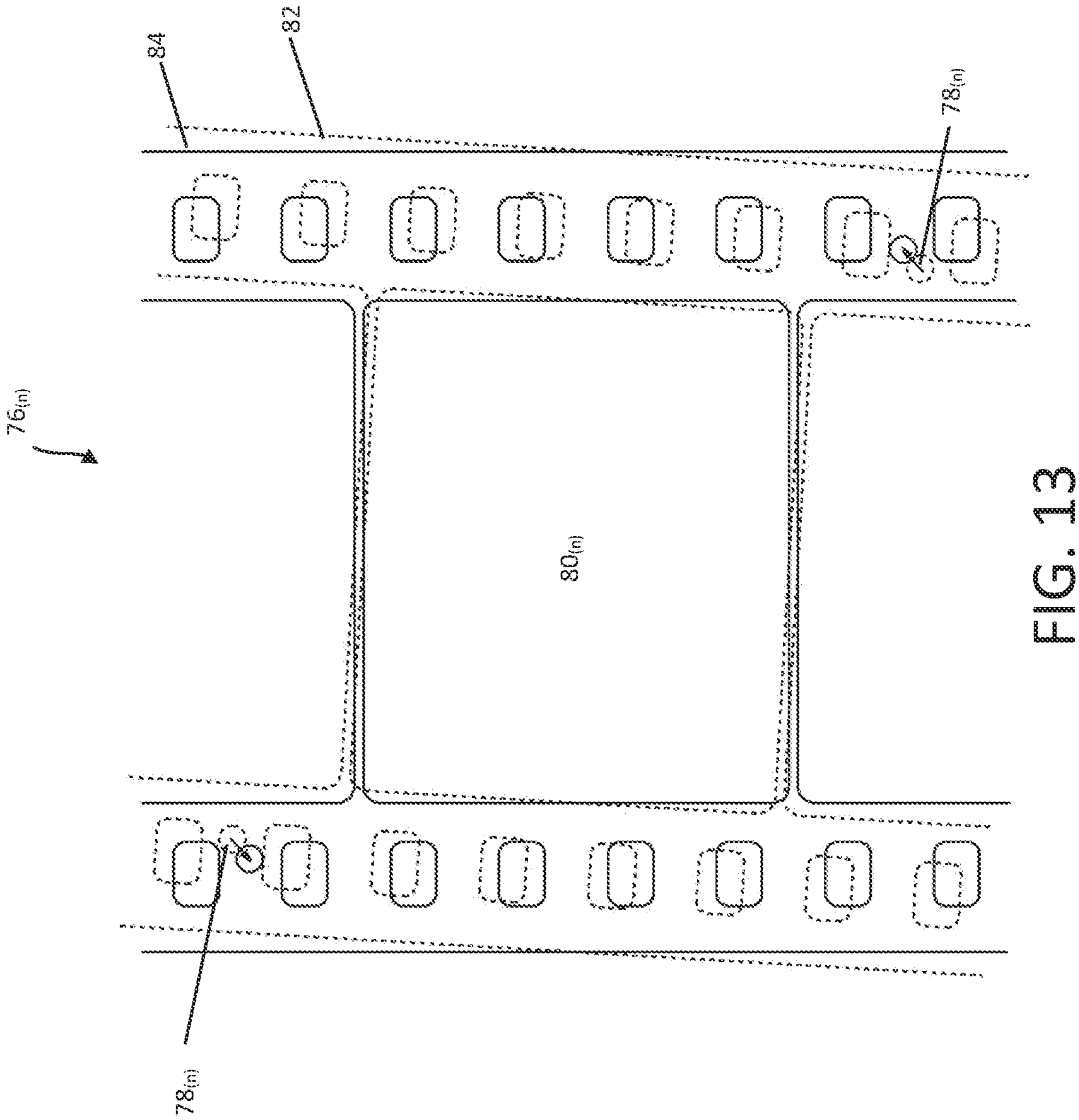
FIG. 13 schematically depicts repositioning of the digital marked frame shown in FIG. 12 in accordance with the principles of the present invention.

Referring to FIG. 13, the dotted lines represent the original position 82 of the digital marked scan 76 and its corresponding digital image 80 and digital fiducial marks 78; and the solid lines represent the repositioned position 84 of the digital marked scan 76 and its corresponding digital image 80 and digital fiducial marks 78. This repositioning causes the digital fiducial marks 78 to be moved to their fixed reference positions. This digital realignment image process dramatically improves the stability of the digital image 80 by (a) accurately locating the positions of the digital fiducial marks 78 on the digital marked scan 76 (e.g., to within less than one pixel), and (b) digitally translating and optionally rotating the digital marked scan 76 along with the digital image 80 contained within the digital marked scan 76 (using image processing techniques well known in the art) so that the digital fiducial marks 78 are repositioned in the same reference position for every digital marked scan 76 of the film 10. Since the fiducial marks 70 are stable relative to the camera lens 24 that exposed the original marked images 72, the repositioning of digital fiducial marks 78 to a fixed reference position results in extremely stable digital images 80 whose stability is completely independent of image-to-image physical film positioning variability in the motion picture camera 14 and in the scanner 50.

Figure 14:
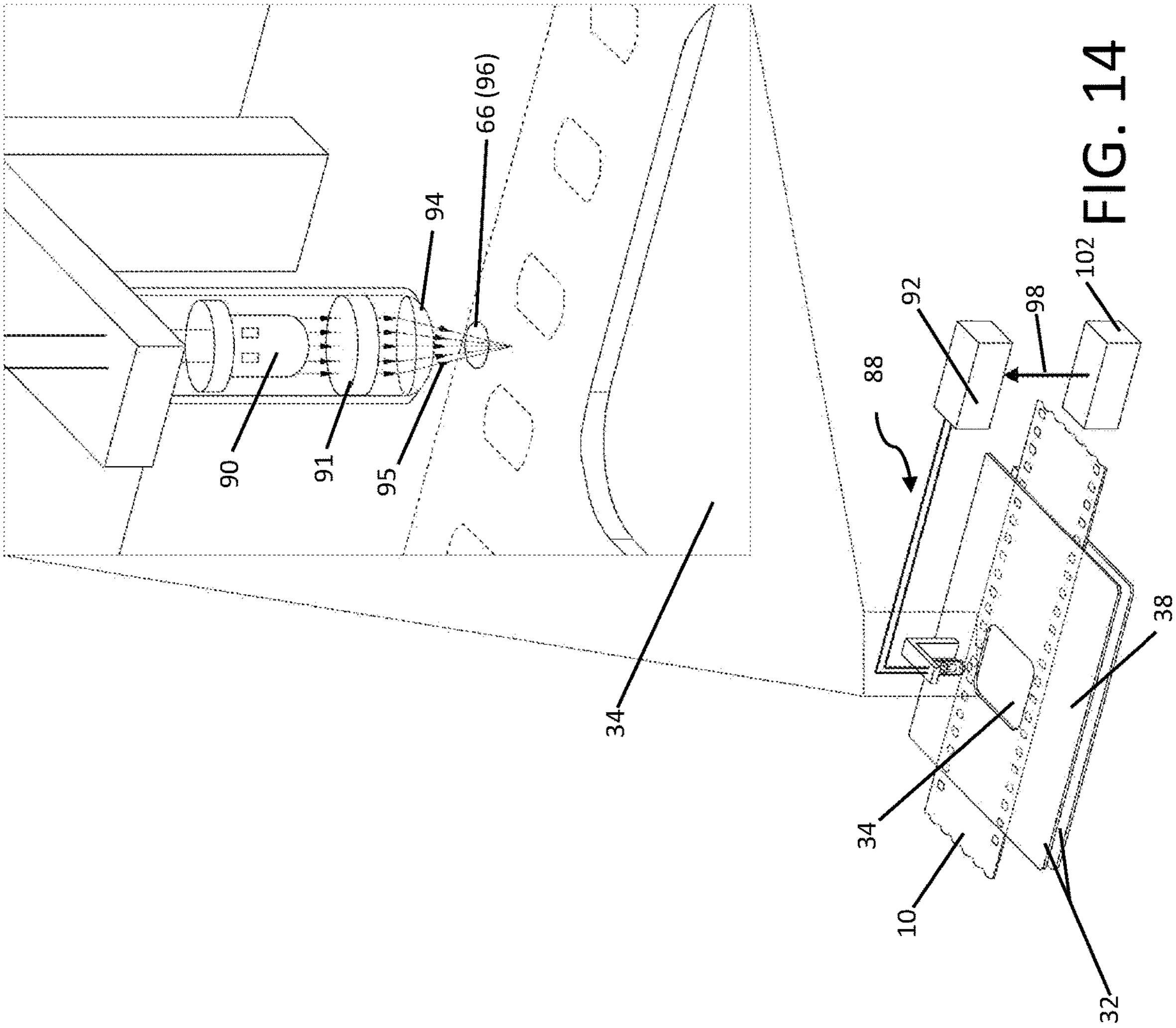
FIG. 14 schematically depicts a portion of a film contained in a film gate of a motion picture camera and the camera's interaction with one embodiment of a fiducial system of the present invention along with a close-up view of the light source and the fiducial marking means of the present invention.
Figure 15:
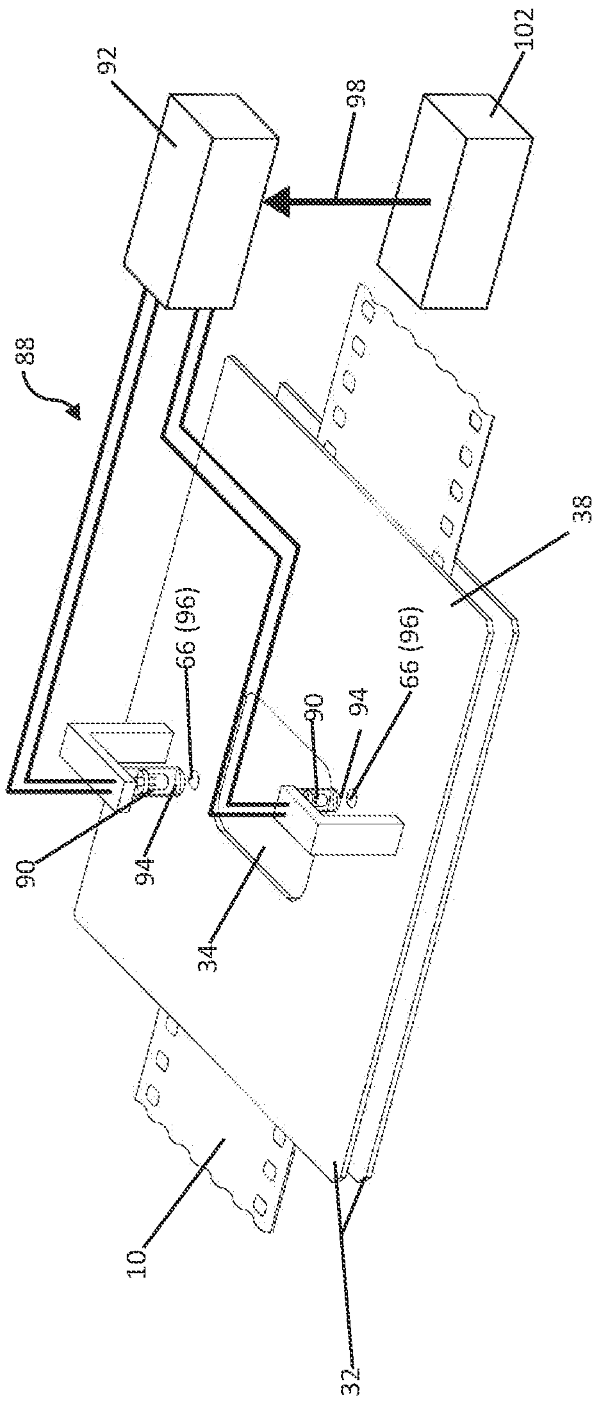
FIG. 15 schematically depicts the same components as shown in FIG. 14 with an additional light source for the fiducial system.

The coincident exposure process 110 can be achieved by incorporating a fiducial system 86 into the camera 14 to capture the fiducial marks 70 onto the unexposed film portion 48 of the film during each of the film hold periods. Referring to FIGS. 14-15, one exemplary embodiment of the fiducial system 86 includes a light source assembly 88 comprising at least one light source 90, an optionally provided light modulator 91, a light source controller 92, the marker lens 94, and one or more fiducial marking means 66 (e.g., a small marker aperture 96) located in the film gate 32 of the camera 14. The light source 90 is an illuminant that is optionally modulated by the light modulator 91. The light modulator 91 can be an electrically controlled light modulator or a mechanical modulator that allows the light coming from the light source illuminant 90 to pass intermittently. The light source controller 92 controls the light source 90 by controlling the illuminant and/or the light modulator 91. The light source controller 92 can be any art-disclosed controller such as an electronic control means (e.g., circuit or the like).

The fiducial marking means 66 can be any art-disclosed device or method to assist the light source 90 in exposing/capturing the fiducial marks 70 onto the unexposed film portion 48 of the film 10 during the film hold period.

The marker lens 94 can be any art-disclosed lens suitable for focusing the light source 90 onto the unexposed film portion 48 (e.g. a conventional lens, a gradient index (GRIN) lens, or any other light focusing mechanism). During the coincident exposure process 110, the marker lens 94 focuses the desired light 95 provided by the light source 90 onto the unexposed film portion 48 of the film 10 through the small marker aperture 96 (which acts as the fiducial marking means 66). Typically, light source 90 is electrically modulated by the controller 92 allowing the light source 90 to flash the light 95 for a predetermined amount of time resulting in appropriate exposure on the unexposed film portion 48. The timing of the exposure flash of the light 95 is controlled by a synchronization signal 98 received from the camera's (14) motor control 102 which is responsible for the camera's (14) synchronous operation of its rotating shutter 42 and claw mechanism 40.

A typical sequence of the coincident exposure process 110 involves the camera 14 holding the film motionless in film gate 32, rotating the shutter 42 to its open position to allow the light 44 to expose the exposed film portion 46 of the marked frame 74$_{(n)}$ to capture the marked image 72$_{(n)}$ while the light source 90 flashes the light 95 to expose the fiducial marking means 66 (e.g., the small marker aperture(s) 96) onto the unexposed film portion 48 of the marked frame 74$_{(n)}$. Thereafter, the camera 14 rotates the shutter 42 to its closed position to block the light 44 and actuates the claw mechanism 40 to advance the film 10 to the next image position 72$_{(n+1)}$. This process is repeated every time that the camera 14 is used to capture the external environment. The coincident exposure process 110 results in the position of the fiducial marks 70 being captured in a fixed position relative to their associated marked images 72. Accordingly, the fiducial marks 70 are in a fixed position relative to all the associated marked images 72. A modification of this sequence allows for the possibility that the light source 90 can flash a little before, during, or after the associated exposure of the marked image 72$_{(n)}$.

Figure 17:
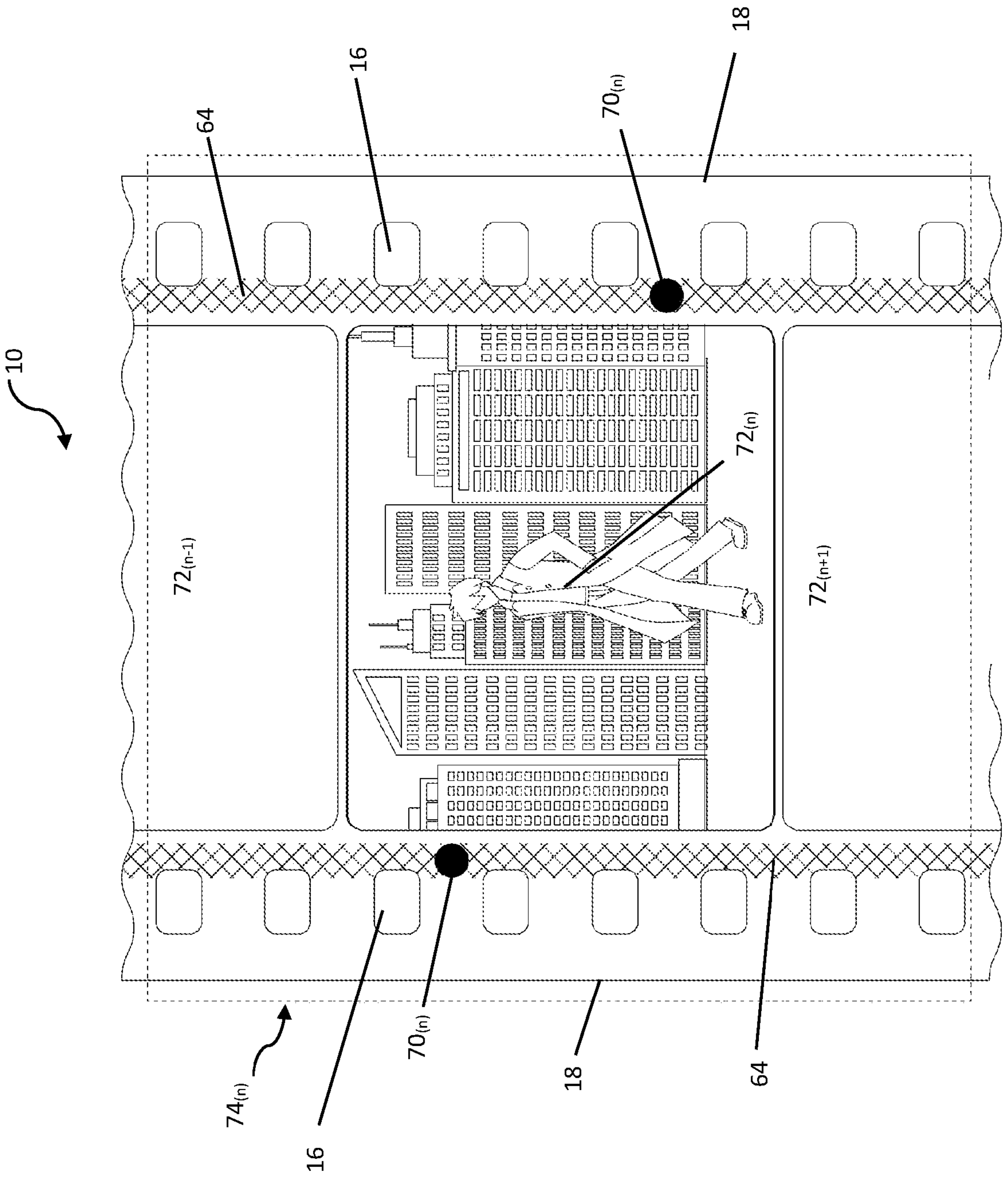
FIG. 17 schematically depicts a front view of the portion of the motion picture film illustrated in FIG. 2 having a marked frame having smears and fiducial markers in accordance with the principles of the present invention.
Figure 18:
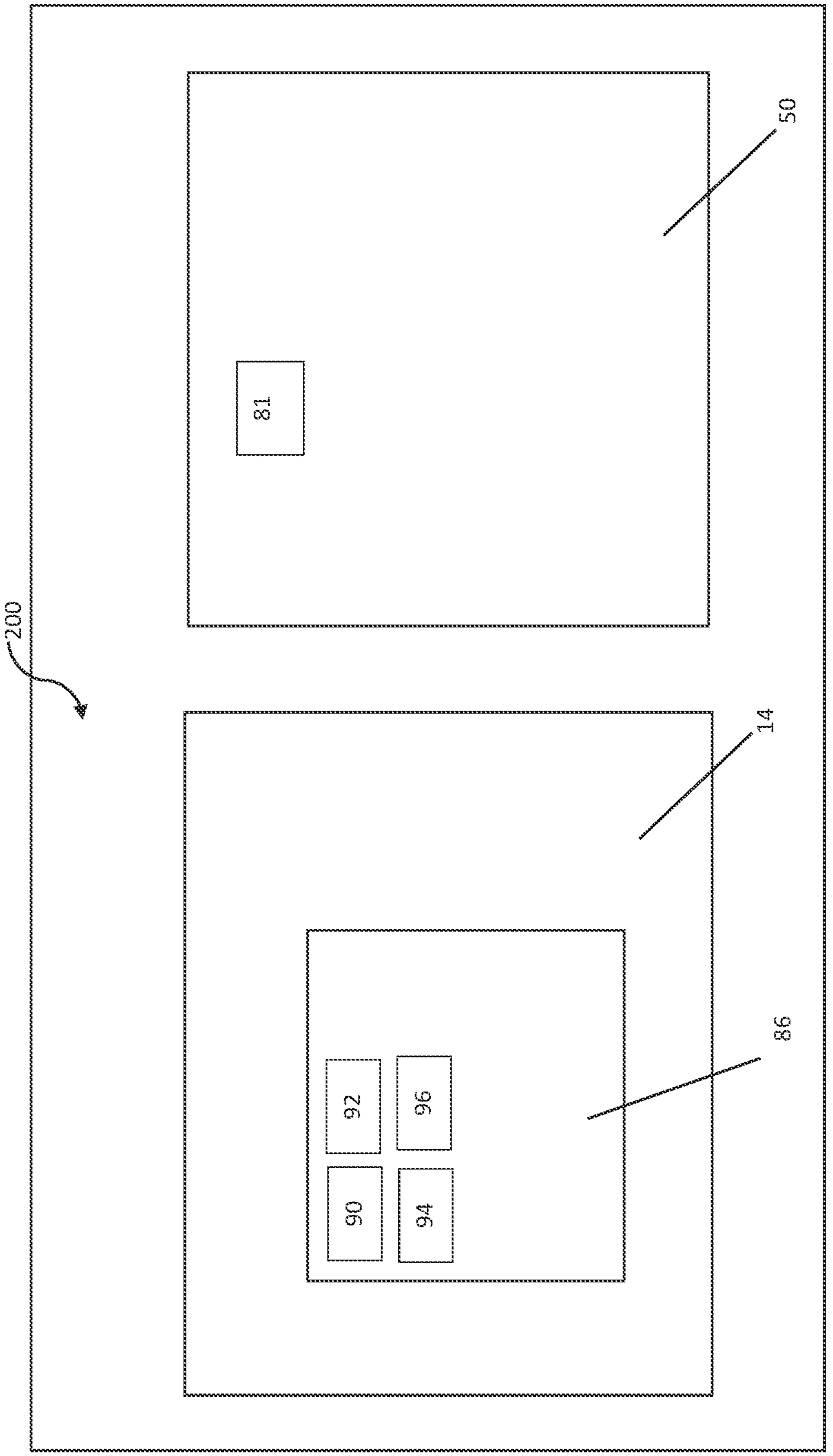
FIG. 18 schematically depicts a motion picture film image stabilization system in accordance with the principles of the present invention.
Figure 19:
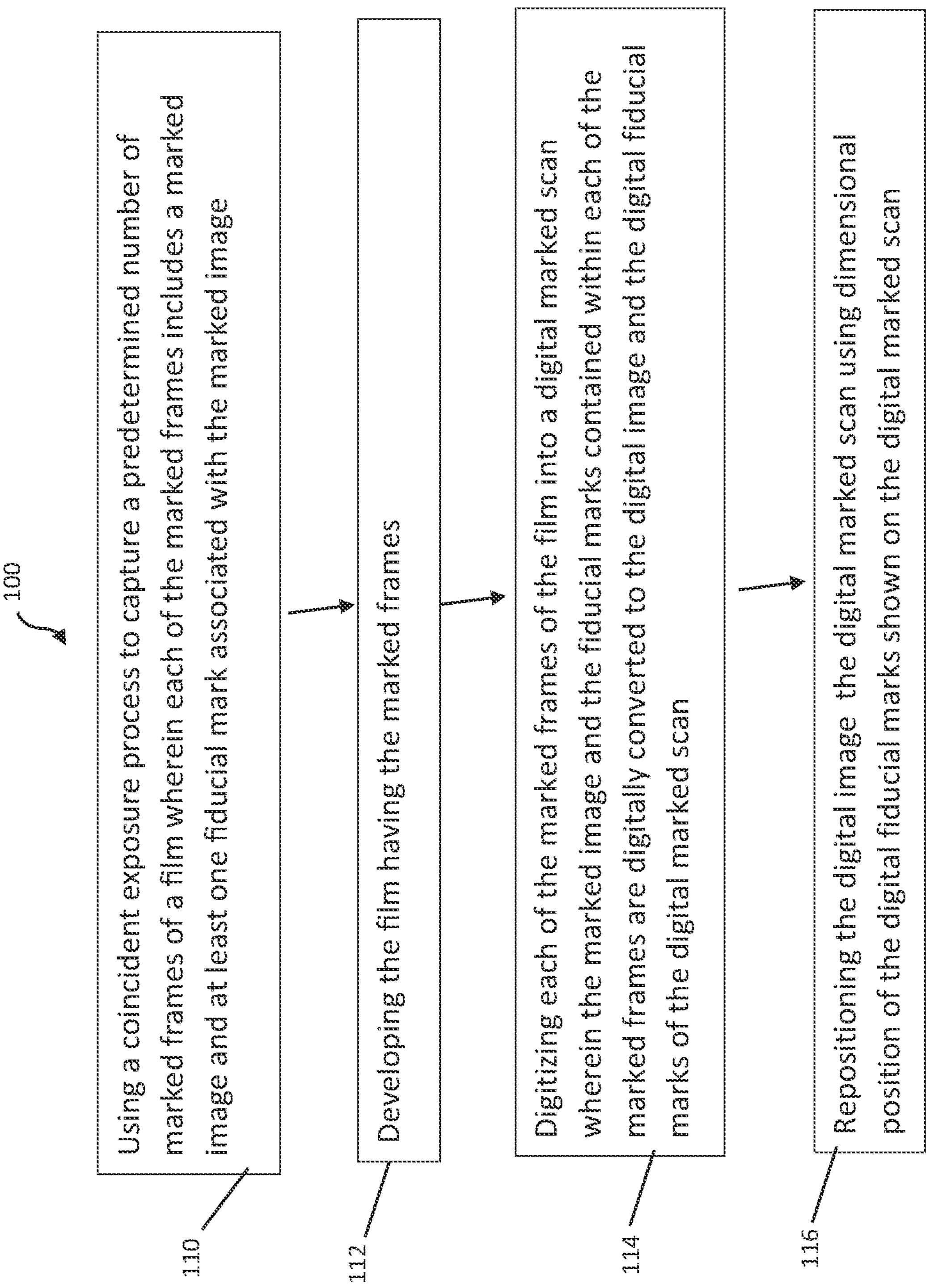
FIG. 19 schematically depicts a motion picture film image stabilization method in accordance with the principles of the present invention.

In another variation of this sequence of the coincident exposure process 110 and referring to FIG. 17, the light source 90 is not modulated from one marked frame 74$_{(n)}$ to the next marked frame 74$_{(n+1)}$ at all and consequently exposes the film 10 continuously, even while the film 10 is being moved from one marked frame $74_{(n)}$ to the next marked frame $74_{(n+1)}$. Since the film 10 is held motionless during the film hold period, the light 95 from the light source 90 exposes a specific part of the film 10 during the film hold period, resulting in a heavily exposed well defined fiducial mark 70 on that specific part of the film 10. The light 95 continues to expose the film 10 while it is being moved from one marked frame $74_{(n)}$ to the next marked frame $74_{(n+1)}$, causing a lightly exposed smear 64 which is easily distinguished from the heavily exposed fiducial mark 70 because of the significant difference in exposure between the smear 64 and the fiducial mark 70.

In another exemplary embodiment of the fiducial system 86, the light source 90 is placed sufficiently far that the light 95 simply casts a shadow of the marker aperture 96 (i.e., the fiducial marking means 66) in the film gate aperture plate 38 onto the unexposed film portion 48 of the film 10. This is done without needing the marker lens 94.

Figure 16:
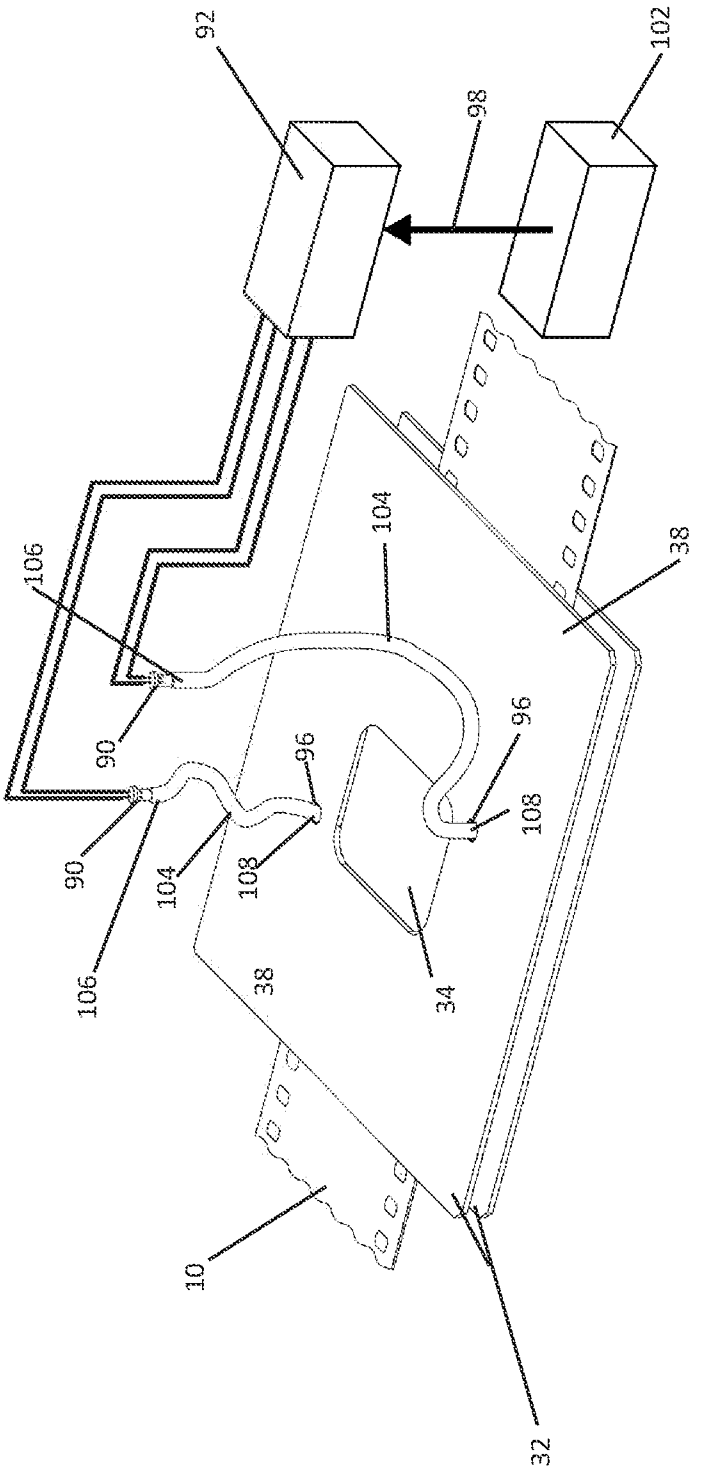
FIG. 16 schematically depicts a portion of a film contained in a film gate of a motion picture camera and the camera's interaction with another embodiment of the fiducial system of the present invention.

Referring to FIG. 16, another exemplary embodiment of the fiducial system 86 is shown wherein the light source 90 is located at one end 106 of an optical fiber 104 while the other end 108 of the optical fiber 104 travels through aperture 96 and is embedded in the film gate aperture plate 38 of the film gate 32. The light 95 from the light source 90 illuminates the optical fiber at one end 106 and the light 95 travels through the optical fiber 104 to the other end 108 of the fiber 104. The light 95 that exits at the other end 108 of the fiber 104 is very close to the film 10 allowing the light 95 to expose the film 10. This design places the other end 108 of the optical fiber 104 very close to the film emulsion 20, thus eliminating the need for the marker lens 94. This design that allows the light source 90 to be far from the film gate 32 is especially helpful when there is little or no physical room for the light source 90 and the marker lens 94 to be placed near the film gate. Essentially, the optic fiber 104 allows the light source 90 to be placed in a remote location relative to the film gate 32 where there is more room for the light source 90. Alternatively, a gradient index lens (GRIN) can be used to focus the other end 108 of the optical fiber 104 onto the film emulsion 20.

Figure 1:
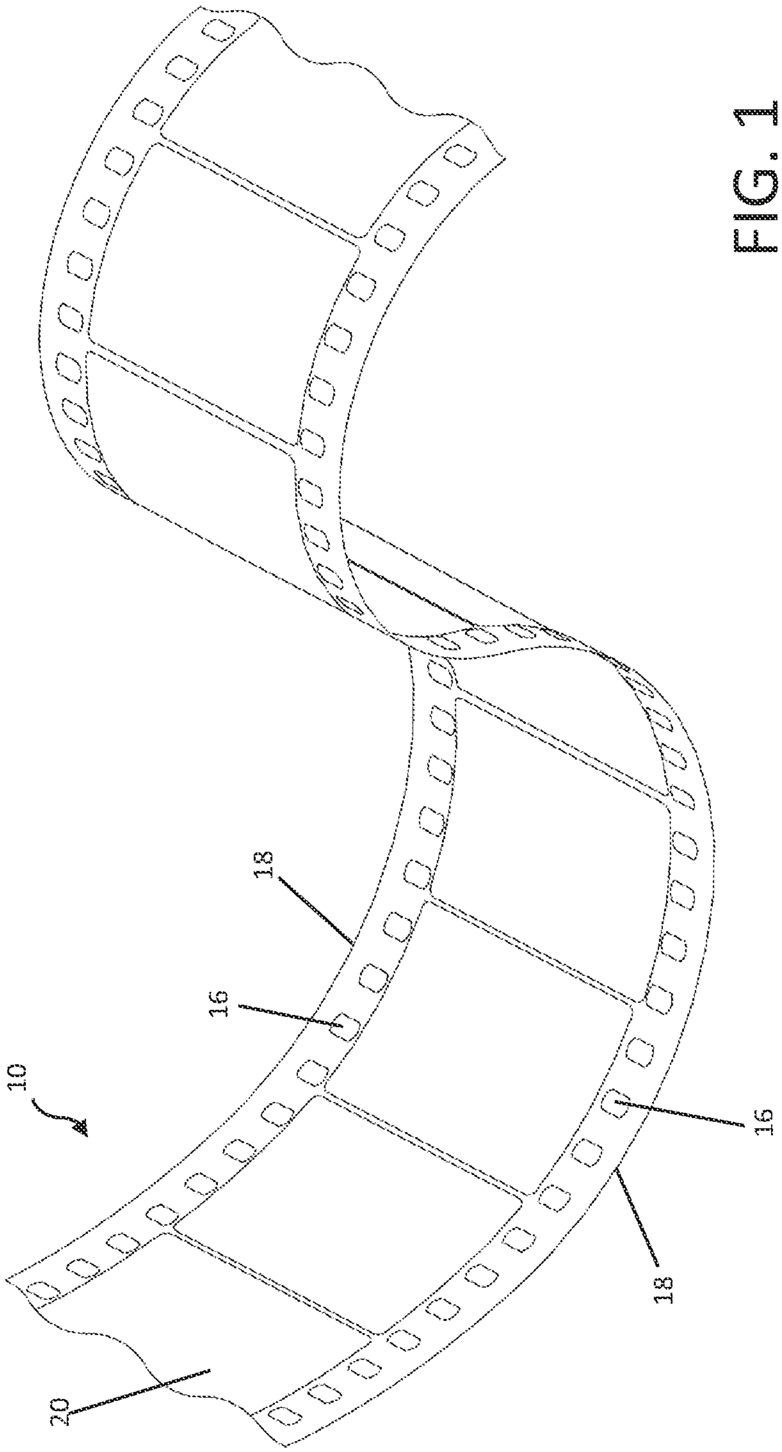
FIG. 1 schematically depicts front perspective view of a portion of a motion picture film.
Figure 2:
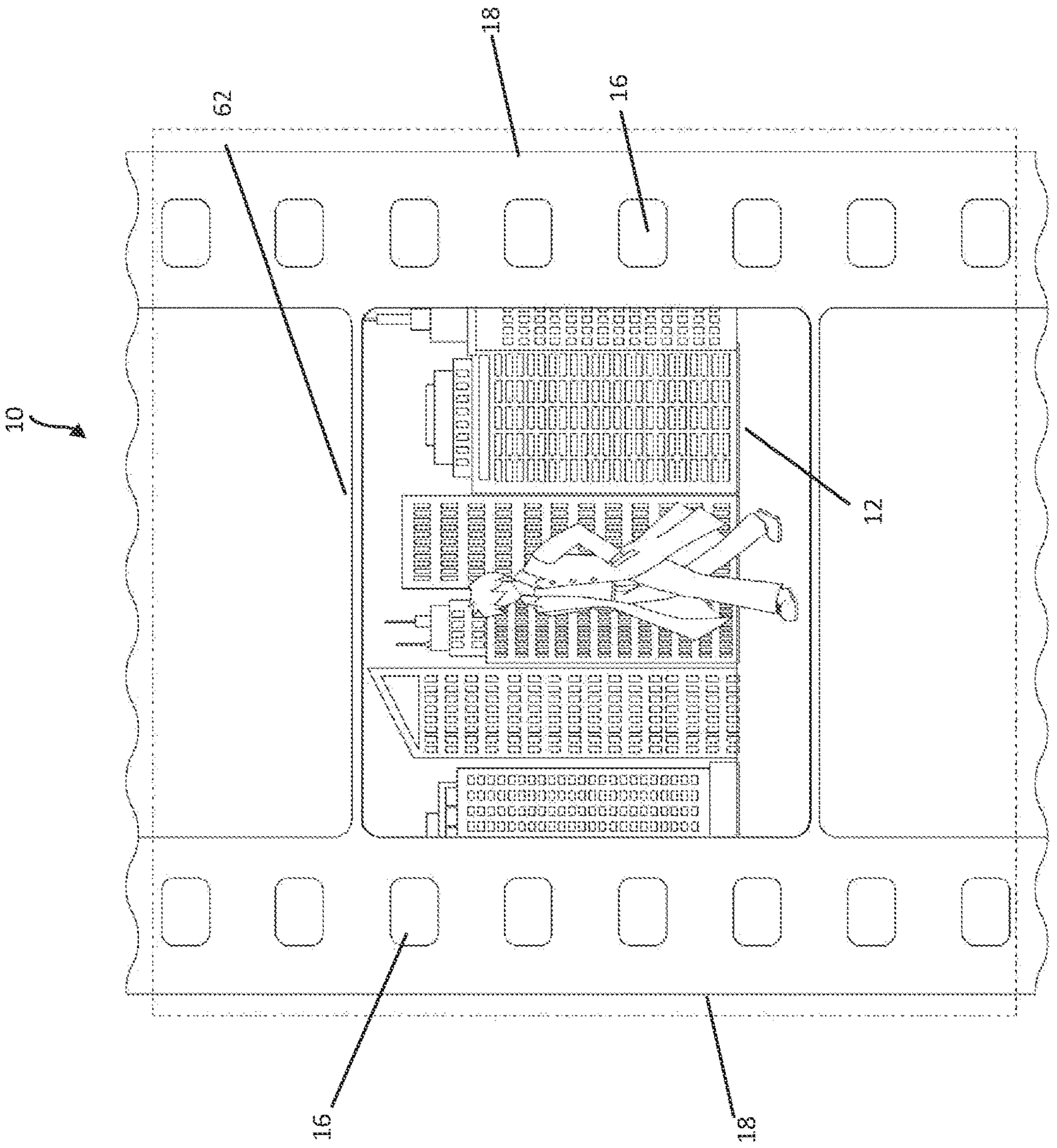
FIG. 2 schematically depicts a front view of a section of the motion picture film illustrated in FIG. 1 containing an image captured by a motion picture camera.
Figure 3:
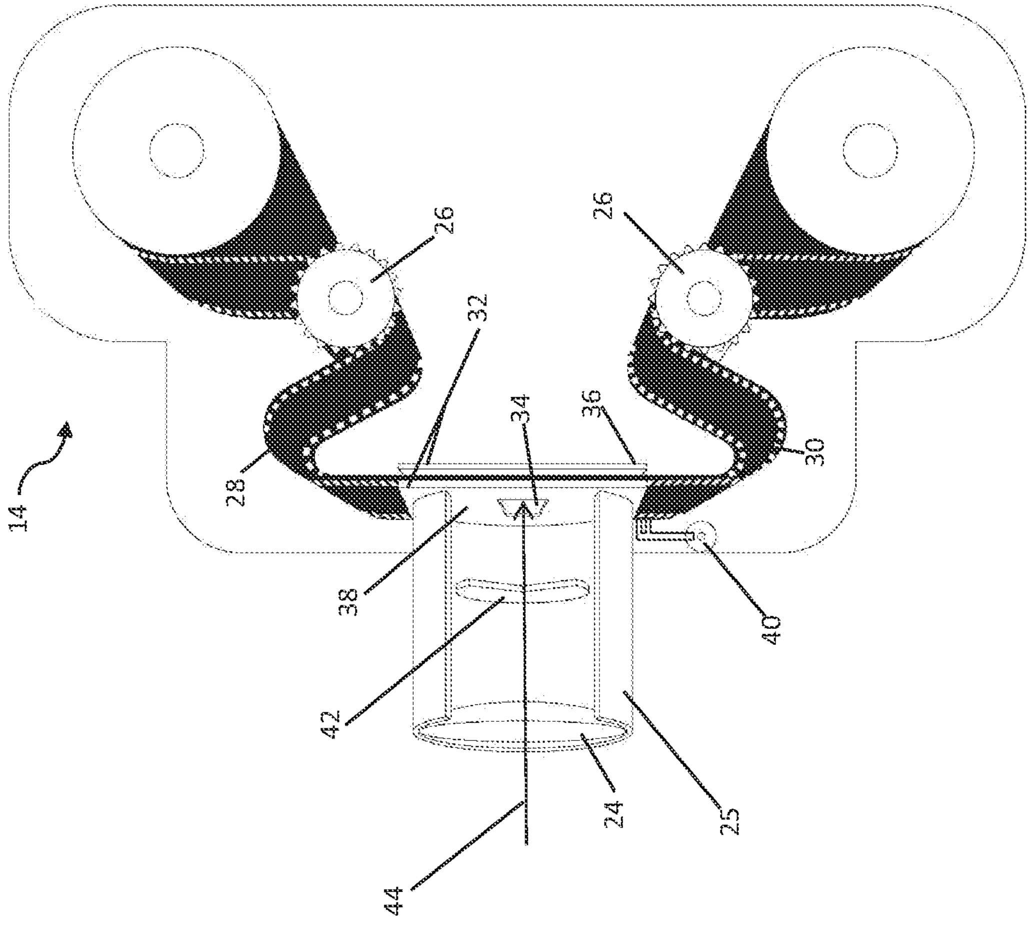
FIG. 3 schematically depicts a perspective cross-section side view of key components of a conventional motion picture film camera containing the motion picture film shown in FIG. 1.
Figure 4:
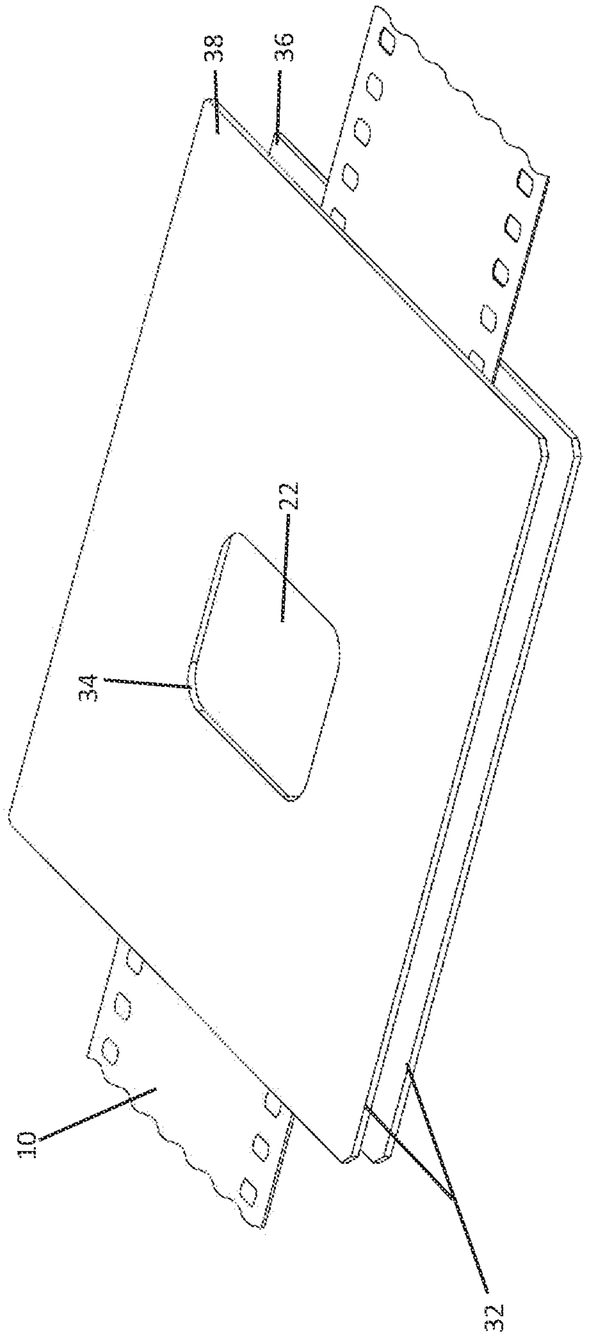
FIG. 4 schematically depicts a close-up front perspective view of a film gate of a motion picture film camera securing a portion of the motion picture film shown in FIG. 1.
Figure 5:
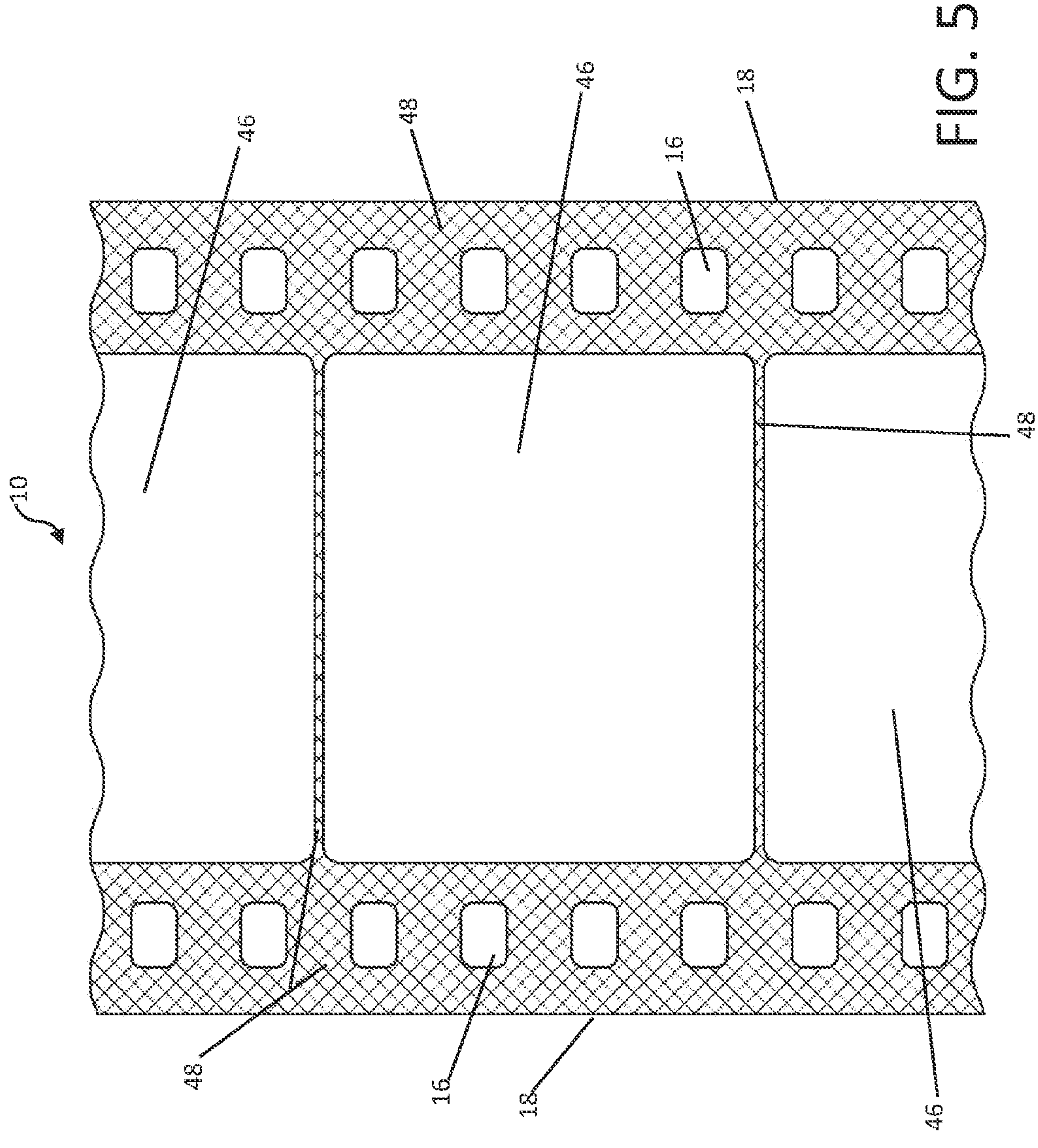
FIG. 5 schematically depicts a front view of the portion of the motion picture film shown in FIG. 2 wherein the unexposed portion is shown with hatching and the exposed film portion is shown without hatching.
Figure 6:
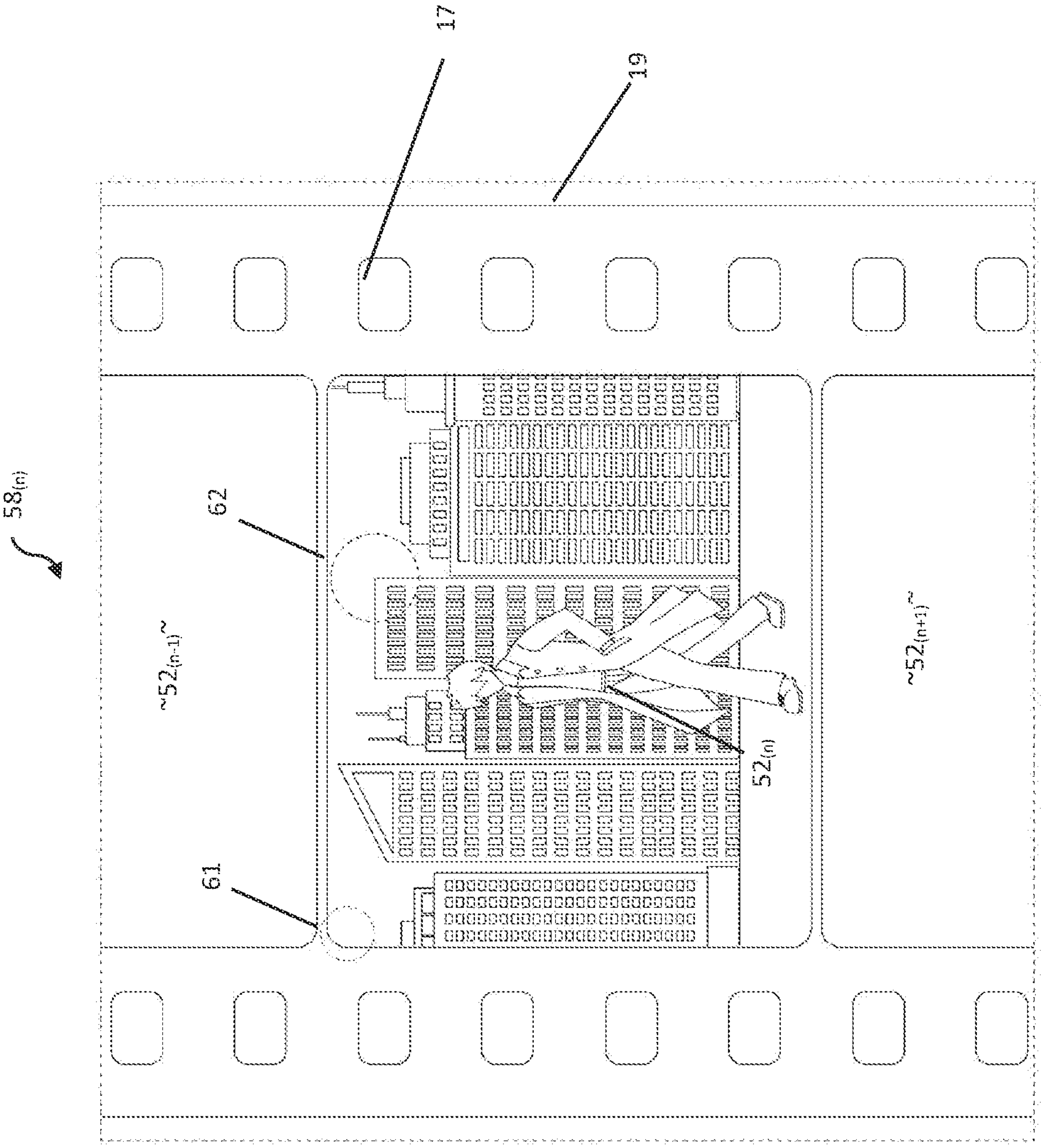
FIG. 6 schematically depicts a front view of a digital scan which is generated when a film scanner scans the image shown in FIG. 2.

Referring to FIG. 14, the present invention contemplates that other art-disclosed components can be used as alternatives to the components described above for the fiducial system 86. For example, many forms of art-disclosed suitable light source assembly 88 can be used to provide the light 95 and other forms of suitable art-disclosed fiducial marking means 66 can be used instead of the small marker aperture(s) 96, etc. For example, the light source assembly 88 embodiments fall generally into four classes: (i) Class 1 light sources 90 includes an illuminant whose emitted light is modulated through electrical means by the light source controller 92; (ii) Class 2 light sources 90 includes an unmodulated illuminant whose light is intermittently blocked by an electrically controlled light modulator 91 of the light source assembly 88, wherein the electrically controlled light modulator 91 is controlled through electrical means by the light source controller 92; (iii) Class 3 light sources 90 includes an unmodulated illuminant whose light is intermittently blocked by a mechanical light modulator (91); and (iv) Class 4 light sources 90 includes an unmodulated illuminant without the light modulator 91. Class 1 light sources 90 include an illuminant whose light output 95 can be directly modulated electrically on millisecond time scales (e.g. LED, laser diode, and electroluminescent device). Class 1 light sources 90 therefore do not require a separate light modulator (91). Class 2 light sources 90 includes an illuminant whose light is intermittently blocked by an electrically controlled light modulator (91). The illuminant (e.g., LED, laser diode, electroluminescent device, incandescent bulb, fluorescent bulb, etc.) generates unmodulated light that travels through the light modulator 91 which is electrically controlled by the light source controller 92 to intermittently allow the light 95 to pass. The light modulator 91 can be of any type well known in the art, such as: (i) absorptive modulators (e.g. Franz-Keldysh effect, Quantum-confined Stark effect, excitonic absorption, changes of Fermi level, changes of free carrier concentration), and (ii) refractive modulators (e.g. using the acousto-optic effect, magneto-optic effect, or polarization changes in liquid crystals). For Class 3 light sources 90 includes an illuminant (e.g., LED, laser diode, electroluminescent device, incandescent bulb, fluorescent bulb, etc.) that generates unmodulated light that travels through the mechanical light modulator (91) which intermittently allows passage of the light 95 from the illuminant to the film. Typical examples include a spinning disk or reciprocating blade with an aperture that allows the light 95 to intermittently pass. The mechanical light modulator (91) can be actuated with a motor, electromagnet, or mechanically connected to any of the other moving mechanisms of camera 14 such as the sprockets 26, the claw mechanism 40, and/or the rotating shutter 42 in FIG. 3. Class 4 light sources 90 include an illuminant (e.g. LED, laser diode, electroluminescent device, incandescent bulb, fluorescent bulb, etc.) which generates unmodulated light (95). Class 4 light sources 90 therefore do not require the light modulator 91.

If only one fiducial mark 70 of the marked frame 74 is captured by the method 100 resulting in one digital fiducial mark 78, then the associated digital image 80 of the same marked frame 74 can be translated in two dimensions. A single digital fiducial mark 78 limits easy access to rotation information required to rotate the digital image 80.

However, the fiducial system 86 can capture more than one fiducial mark 70 with more than one fiducial marking means 66 and/or additional light source (e.g., two LEDs 90 as shown in FIGS. 15-16). Capturing more than one fiducial mark 70, resulting in multiple digital fiducial marks 78, allows the method 100 to translate the digital image 80 both horizontally and vertically, and in addition to rotate the digital image 80 so that the digital fiducial marks 78 are both moved (along with the rest of the digital image 80) to a predetermined fixed position. Accordingly, it is preferred that the system 200 and the method 100 capture two or more fiducial marks 70 thereby yielding two or more digital fiducial marks 78 for the desired translation and rotation of the digital image 80 and its associated digital marked scan 76.

It should be noted that the method 100 is applicable to all motion picture film formats (e.g., 8 mm, Super 8 mm, 16 mm, 35 mm, 65 mm, 70 mm, etc.) and to all image sizes on those formats (e.g., Super 16 mm, 4-perforation 35 mm, Super 35 mm, VistaVision, 5-perforation 65 mm, IMAX 8-perforation 65 mm, IMAX 15-perforation 65 mm, etc.).

The method 100 of the present invention provides many advantages including but not limited to: (i) the accuracy of the image stabilization can be increased to levels which are not attainable through the use of physical film features such as the location of perforations 16 and edges 18, (ii) the manufacturing tolerances for the perforation and cutting of film during manufacture can be relaxed resulting in lower costs, (iii) the tolerances of the motion picture camera film handling mechanism can be relaxed to allow more variability in the frame to frame film position resulting in lower costs and reduced camera noise, (iv) the tolerances of the film scanner mechanism can be relaxed resulting in lower cost, (v) the stabilization process is fully automated, requiring no manual intervention at any point in the process.

While fiducial marks have been placed on photographic films during their manufacturing process to assist later digital scanning of still photographic images (see U.S. Pat. No. 6,278,482B1—hereinafter referred to as the "Sartor patent"), fiducial marks have not been used for motion picture film image stabilization including the coincident exposure process 110 described above. The Sartor patent's teaching cannot provide the desired motion picture film image stabilization because it teaches that the fiducial markers are exposed at the film factory during its manufacturing process, while the images are exposed at a different and later time thus only approximately positioned relative to the fiducial marks. In contrast, the method 100 captures the fiducial marks 70 in the motion picture camera 14 during the film holding period (defined hereinafter as "coincident") that each associated marked image 72 is captured on the film 10. This allows the relative position between the marked image 72 and the fiducial marks 70 to be extremely accurate. The Strator patent is applicable to still photographic cameras where inter-frame image jitter is irrelevant. Strator patent does not solve inter-frame jitter of motion picture film. The method 100 of the present invention solves the inter-frame jitter of motion picture film by using the coincident exposure process 110 to capture the fiducial marks 70 during the film hold period of the associated marked image 72 and using the fiducial marks 70 via its subsequently converted digital fiducial marks 78 to stabilize the digital images 80 via the digital realignment image process 116 described above.

Figure 7:
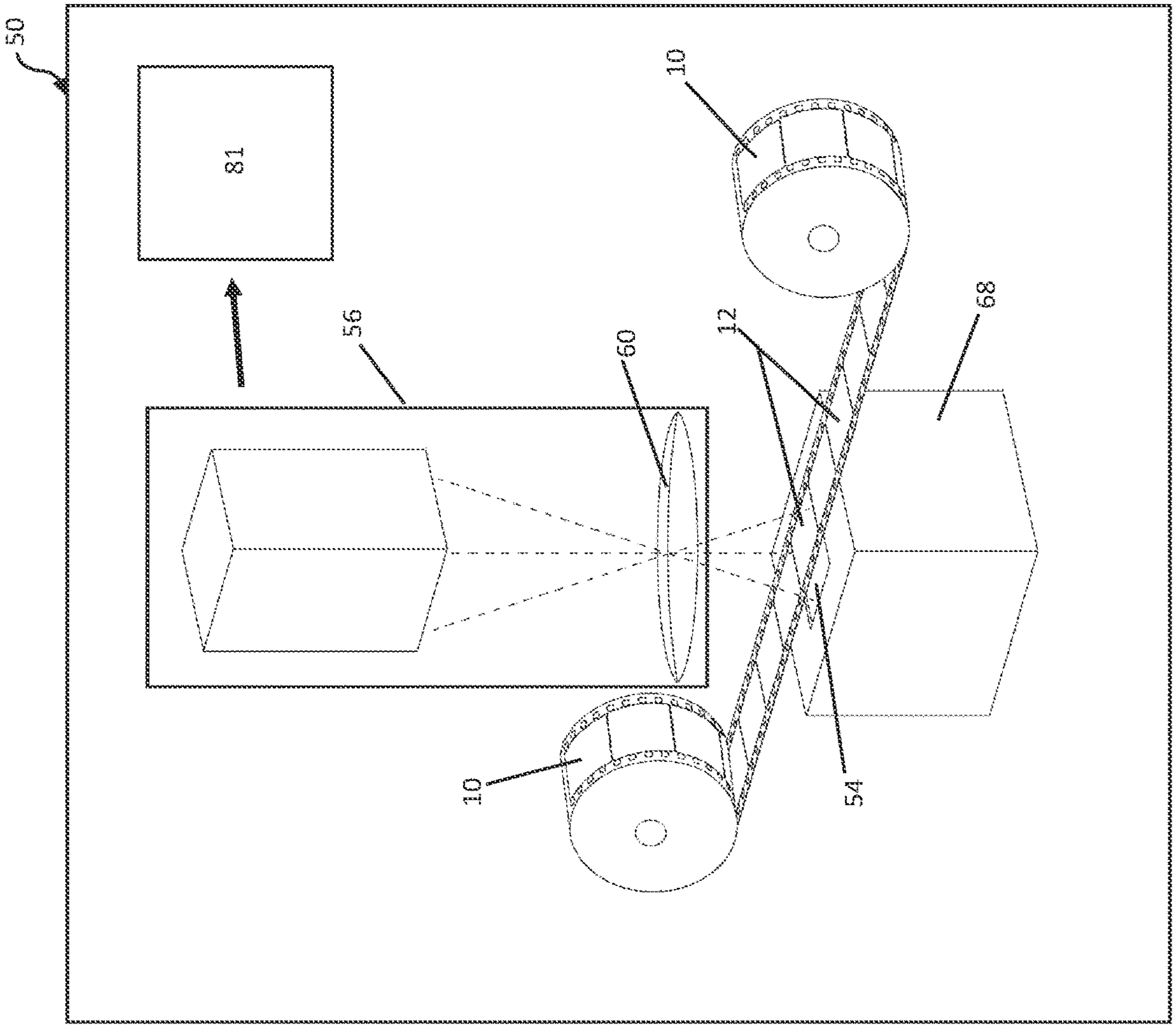
FIG. 7 schematically depicts key components of a conventional film scanner that includes a processor of the present invention.
Figure 8:
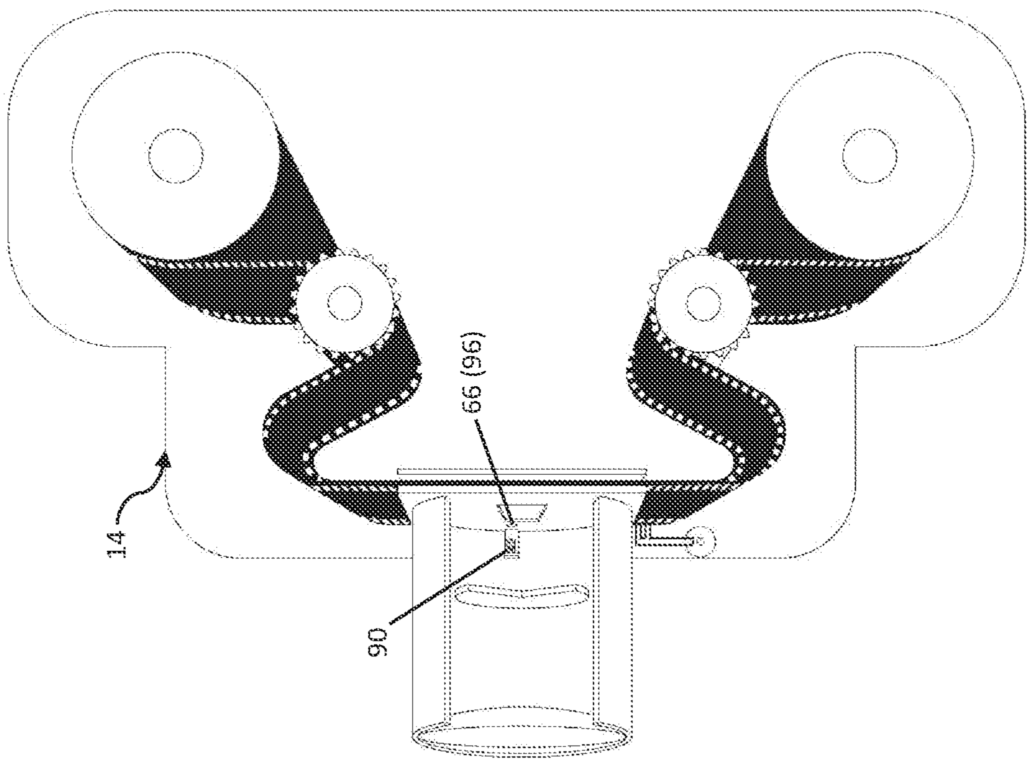
FIG. 8 schematically depicts the perspective cross-section side view of key components of conventional motion picture film camera shown in FIG. 3 with a light source and a fiducial marking means in accordance with the principles of the present invention.

As discussed above and referring to FIG. 18, the present invention provides the motion picture film image stabilization system 200 comprising the motion picture camera 14 having the fiducial system 86, the scanner 50, and the processor 81. It should be noted that the processor 81 can be a separate device from the scanner 50 or be optionally incorporated into the scanner 50 as shown in FIG. 7. These components (14, 86, 50, and 81) of the image stabilization system 200 are used to perform the method 100.

As discussed above and referring to FIG. 19, the present invention provides the motion picture film image stabilization method 100 which includes first using the coincident exposure process 110 to capture a predetermined number of marked frames 74 of the film 10 wherein each of the marked frames 74 includes the marked image 72 and the fiducial marks 70 associated with the marked image 72. For example, the marked frame $\mathbf{74}_{(n)}$ includes the marked image $\mathbf{72}_{(n)}$ and the fiducial marks $\mathbf{70}_{(n)}$ associated with the marked image $\mathbf{72}_{(n)}$. The marked frame $\mathbf{74}_{(n+1)}$ includes the marked image $\mathbf{72}_{(n+1)}$ and the fiducial marks $\mathbf{70}_{(n+1)}$ associated with the marked image $\mathbf{72}_{(n+1)}$.

The coincident exposure process 110 to capture each of the marked frames 74 includes exposing an image of external environment onto the exposed film portion 46 of the film 10 using the camera 14 during the film hold period resulting in the marked image 72 contained within the marked frame 74; and exposing the fiducial marking means 66 onto the unexposed film portion 48 of the film 10 using the fiducial system 86 during the same film hold period resulting in the fiducial marks 70 being also contained within the marked frame 74. Accordingly, the coincident exposure process 110 allows the fiducial marks 70 to be associated with the marked image 72 contained within that specific marked frame 74.

After coincident exposure process 110 has been completed, the method 100 includes the film developing process 112 wherein the film 10 having the marked frames 74 is developed.

After the film developing process 112 is completed, the method 100 further includes the film digitizing process 114 to digitize each of the marked frames 74 into the digital marked scan 76 wherein the marked image 72 and the fiducial marks 70 contained within each of the marked frames 74 are digitally converted to the digital image 80 and the digital fiducial marks 78 of the digital marked scan 76.

Once the digitizing process 114 has converted the marked frames 74 into the digital marked scans 76, the method further includes repositioning the digital image 80 of each digital marked scan 76 using dimensional position of the digital fiducial marks 78 shown on each digital marked scan 76. This digital image repositioning process 116 can be completed for each digital marked scan 76 at any time, including but not limited to, immediately after completion of the digitizing process 114 for that specific digital marked scan 76. It is not required to wait until all of the marked frames 74 of the film 10 have been digitized into digital marked scans 76 before starting the digital image repositioning process 116 of a particular digital marked scan 76.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

What is claimed is:

1. A motion picture film image stabilization method comprising:

using a coincident exposure process to capture a predetermined number of marked frames of a film wherein each of the marked frames includes a marked image and at least one fiducial mark associated with the marked image, wherein the coincident exposure process to capture each of the marked frames includes:

exposing an image of external environment onto exposed film portion of the film using a motion picture film camera during a film hold period resulting in the marked image contained within the marked frame; and exposing at least one fiducial marking means onto unexposed film portion of the film using a fiducial system during the film hold period resulting in the at least one fiducial mark also contained within the marked frame, thereby being associated with the marked image contained within the marked frame;

wherein the coincident exposure process captures during the film hold period and within the marked frame, both the marked image and the at least one fiducial mark associated with the marked image;

developing the film having the marked frames;

digitizing the film using a scanner resulting in digital marked scans of the marked frames wherein:

the marked image of each of the marked frames is digitally converted into a digital image; and the least one fiducial mark associated with the marked image is digitally converted into the at least one digital fiducial mark; and repositioning the digital image contained within each of the digital marked scans translationally using dimensional position of the at least one digital fiducial mark shown on each of the digital marked scans to provide a 2-dimensional stabilization of the digital image.

2. The method of claim 1 wherein there are at least two of the digital fiducial marks and the digital image is stabilized by repositioning the digital image via translation and rotation of the digital image.

3. The method of claim 1 wherein the digital image is translated both vertically and horizontally.

4. The method of claim 1 wherein the film hold period is defined as the period of time while the film is being held motionless in a film gate of the camera resulting in the marked frame containing both the at least one fiducial mark and the marked image.

5. The method of claim 1 wherein during the film hold period, the exposing an image of external environment onto exposed film portion of the film process occurs before the exposing the at least one fiducial marking means onto unexposed film portion of the film process.

6. The method of claim 1 wherein during the film hold period, the exposing an image of external environment onto exposed film portion of the film process occurs after the exposing the at least one fiducial marking means onto unexposed film portion of the film process.

7. The method of claim 1 wherein during the film hold period, the exposing an image of external environment onto exposed film portion of the film process occurs simultaneously with the exposing the at least one fiducial marking means onto unexposed film portion of the film process.

8. The method of claim 1 wherein the at least one fiducial mark is located adjacent to the marked image.

9. The method of claim 1 wherein the at least one fiducial mark is not located adjacent to the marked image.

10. The method of claim 1 wherein the fiducial system is incorporated into a motion picture film camera; and the fiducial system includes at least one fiducial marking means and a light source assembly that provides light need for exposing the at least one fiducial mark onto the unexposed film portion of the film during the film hold period.

11. A motion picture film image stabilization system comprising a motion picture camera having a fiducial system wherein:

during an image capturing process, the camera captures images of an external environment onto exposed portion of a film by exposing the exposed portion of the film to light coming from the external environment during film hold periods, resulting in marked images contained in marked frames;

during a fiducial mark capturing process, the camera, assisted by the fiducial system having at least one fiducial marking means and a light source, captures at least one fiducial mark onto unexposed portion of the film during film hold periods by the camera, resulting in the at least one fiducial mark contained in each of the marked frames;

the image capturing process and the fiducial mark capturing process for each of the marked frames are coincident and collectively known as a coincident exposure process, wherein the coincident exposure process captures during the film hold period both the marked image and the at least one fiducial mark associated with the marked image, resulting in each of the marked frames having both the marked image and the at least one fiducial mark associated with the marked image; and each of the film hold periods is a period of time when the film is being held motionless in a film gate of the camera for completion of both the image capturing process and the fiducial mark capturing process for each of the marked frames.

12. The system of claim 11 further comprising:

a film development process system that develops the marked frames;

a scanner that digitizes the marked frames into digital marked scans wherein each of the digital marked scans contains a digital image of the marked image, and a digital at least one fiducial mark that is a digital representation of the at least one fiducial mark corresponding to the marked image; and a processor that stabilizes the digital image of the marked image of each of the digital marked scans translationally by repositioning each of the digital marked scans based upon dimensional position of the digital at least one fiducial mark to provide a 2-dimensional stabilization of the digital image.

13. The system of claim 12 wherein the fiducial system provides at least two of the digital fiducial marks, and the digital image of the marked image of each of the digital marked scans is stabilized by repositioning each of the digital marked scans via translation and rotation.

14. The system of claim 11 wherein the fiducial system is incorporated into the camera; and the fiducial system includes at least one fiducial marking means and a light source assembly having a light source having an illuminant that provides light needed for exposing the at least one fiducial mark onto the unexposed film portion of the film during the film hold periods.

15. The system of claim 14 wherein the illuminant is selected from the group consisting of a light emitting diode "LED", a laser diode, an electroluminescent device, an incandescent bulb, and a fluorescent bulb.

16. The system of claim 14 wherein the light source assembly further includes an electrical control means and the illuminant is electrically modulated by the electrical control means.

17. The system of claim 14 wherein the illuminant is unmodulated.

18. The system of claim 17 wherein the light source assembly further includes a light modulator that modulates the light coming from the illuminant, wherein the light modulator is selected from a group consisting of:

an electrically controlled light modulator controlled by the electrical control means; and a mechanical light modulator that allows the light coming from the illuminant to pass intermittently.

19. The system of claim 14 wherein the light source includes an optical fiber having a first end that is illuminated by the illuminant and having a second end that provides the light needed for exposing the at least one fiducial mark onto the unexposed film portion of the film during the film hold periods, wherein the second end of the optical fiber also acts as the at least one fiducial marking means.

20. The system of claim 14 wherein the light source further includes a lens to focus light provided by the illuminant.

* * * * *